United States Patent
Kasai et al.

(10) Patent No.: US 9,107,425 B2
(45) Date of Patent: Aug. 18, 2015

(54) SAUSAGE SUSPENSION MEMBER AND METHOD AND APPARATUS FOR SUSPENDING SAUSAGE ON SUSPENSION MEMBERS FROM STICK

(71) Applicant: HITEC Co., Ltd., Kanagawa (JP)

(72) Inventors: Minoru Kasai, Kanagawa (JP); Tatsuo Nakamura, Kanagawa (JP); Takayuki Fujimaki, Kanagawa (JP)

(73) Assignee: HITEC Co., Ltd., Kanagawa (JP)

( * ) Notice: Subject to any disclaimer, the term of this patent is extended or adjusted under 35 U.S.C. 154(b) by 0 days.

(21) Appl. No.: 14/300,548

(22) Filed: Jun. 10, 2014

(65) Prior Publication Data

US 2015/0126103 A1    May 7, 2015

(30) Foreign Application Priority Data

Nov. 1, 2013    (JP) .................................. 2013-228385

(51) Int. Cl.
   *A22C 15/00*    (2006.01)

(52) U.S. Cl.
   CPC .................................... *A22C 15/001* (2013.01)

(58) Field of Classification Search
   USPC ..................... 452/30–32, 35–37, 46–51, 177, 452/179–184
   See application file for complete search history.

(56) References Cited

U.S. PATENT DOCUMENTS

| | | | |
|---|---|---|---|
| 6,869,353 B2 * | 3/2005 | Kasai | 452/186 |
| 7,000,816 B1 * | 2/2006 | Mikelsons et al. | 226/2 |
| 7,160,184 B1 | 1/2007 | Lebsack et al. | |
| 7,249,997 B2 * | 7/2007 | Kasai | 452/51 |
| 7,588,485 B1 * | 9/2009 | Nakamura et al. | 452/51 |
| 8,151,973 B2 * | 4/2012 | Borkiewicz et al. | 198/465.4 |
| 8,545,293 B2 * | 10/2013 | Lendenmann | 452/51 |

FOREIGN PATENT DOCUMENTS

| | | |
|---|---|---|
| JP | 119180 A | 1/1999 |
| JP | 2003070416 A | 3/2003 |
| JP | 2003158991 A | 6/2003 |
| JP | 2009501118 A | 1/2009 |

* cited by examiner

*Primary Examiner* — Richard Price, Jr.
(74) *Attorney, Agent, or Firm* — Bachman & LaPointe, P.C.

(57) ABSTRACT

A sausage suspension member undergoes primary pivoting whereby an opening portion with an inner link of a sausage placed thereon is moved about a pivot axis laterally inwardly, and after the primary pivoting the sausage suspension member undergoes secondary pivoting whereby the opening portion with the inner link placed thereon is moved about the pivot axis laterally inwardly so as to move the opening portion with the inner link placed thereon laterally inwardly away from a stick in a state of being inserted between the inner link and an outer link.

6 Claims, 13 Drawing Sheets

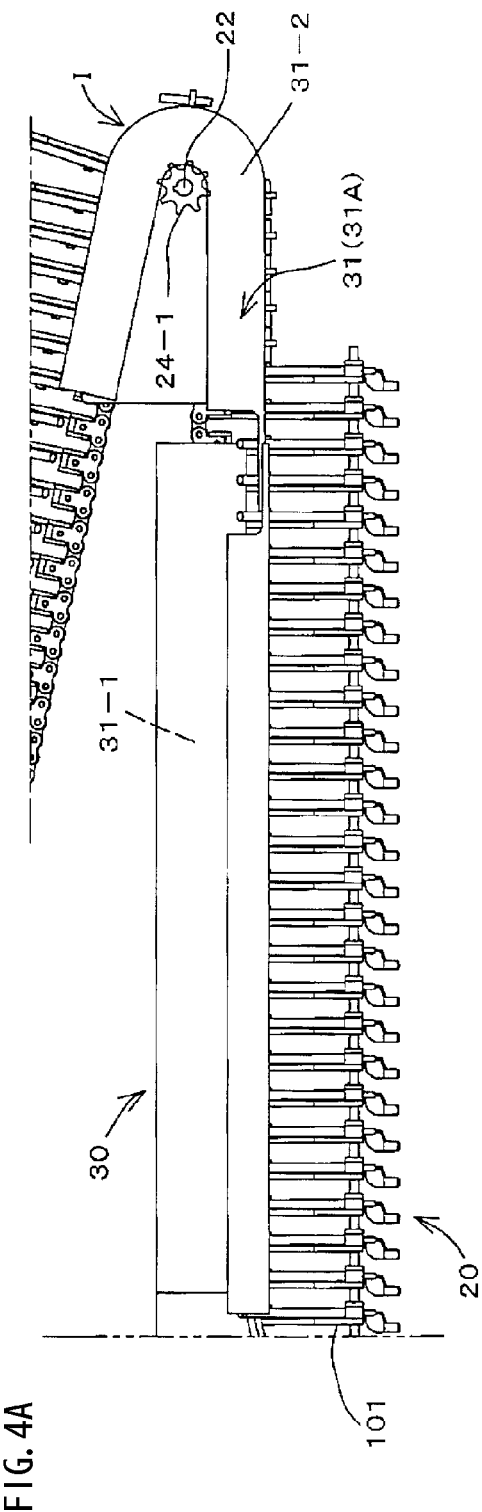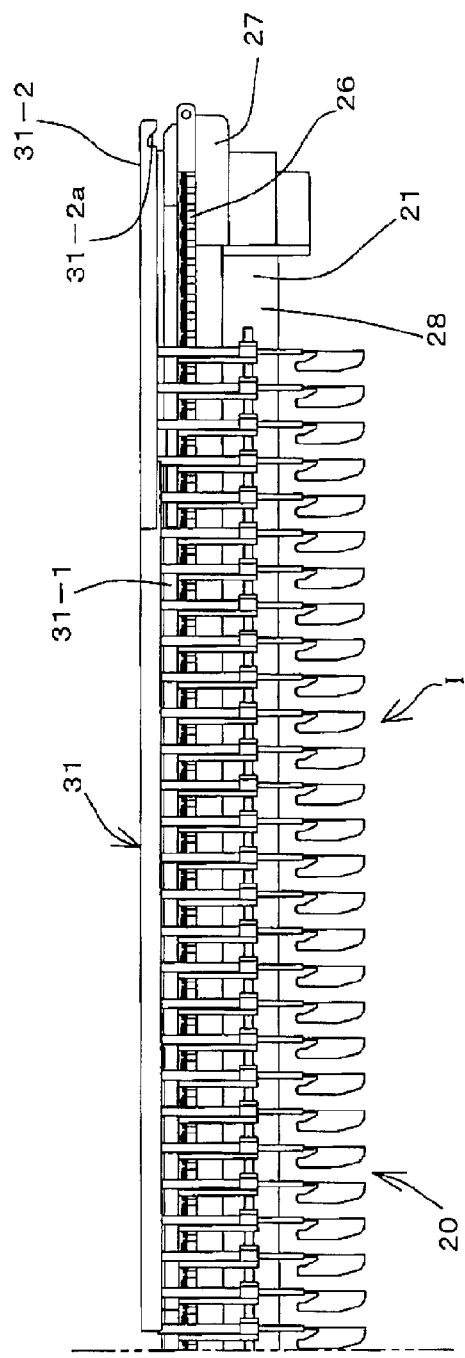
FIG. 4A
FIG. 4B

FIG. 6A
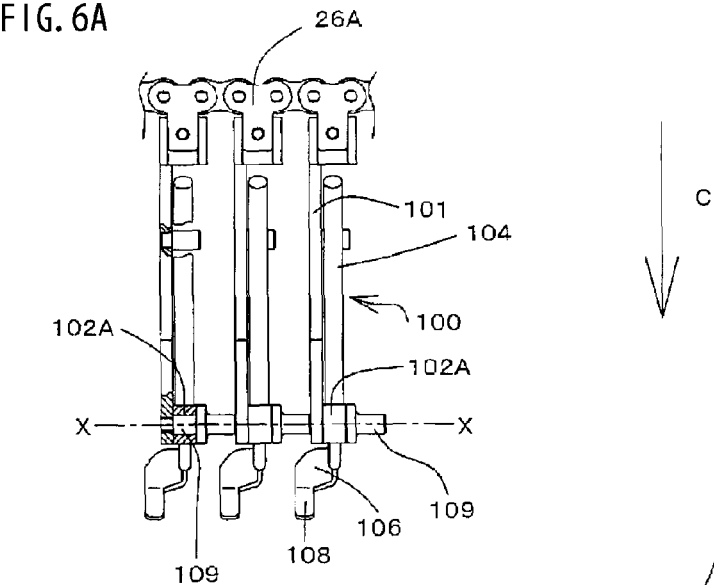
FIG. 6B
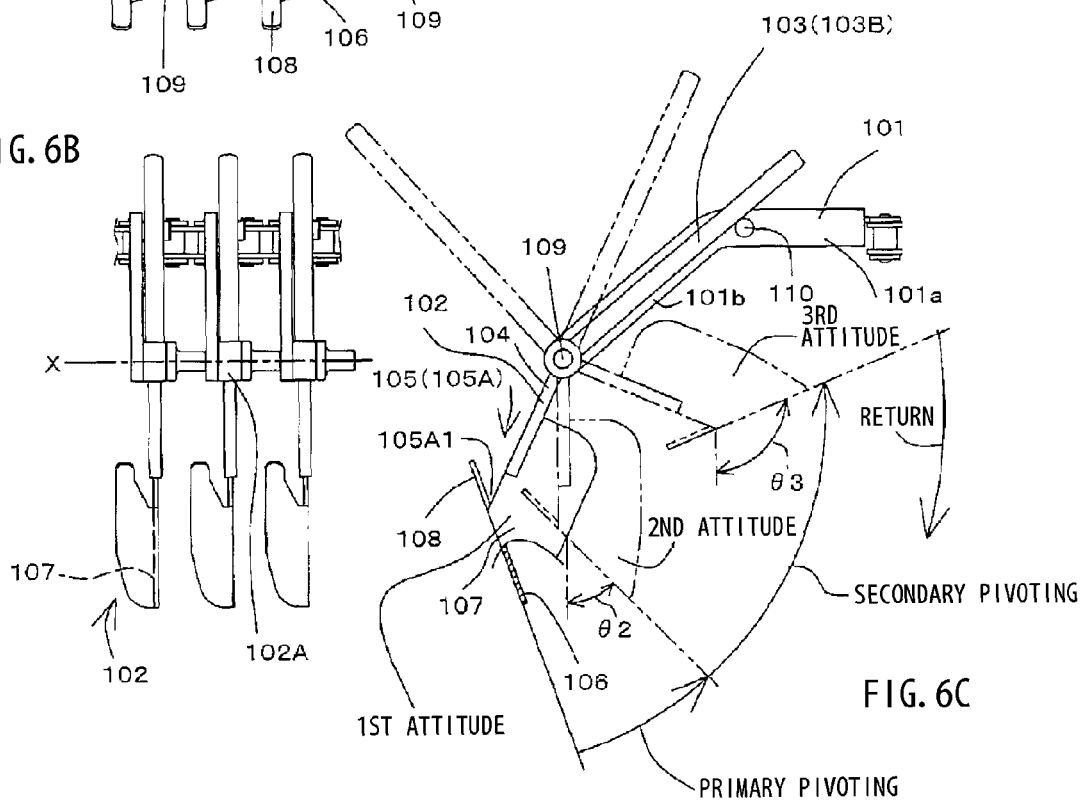
FIG. 6C

SAUSAGE SUSPENSION MEMBER AND METHOD AND APPARATUS FOR SUSPENDING SAUSAGE ON SUSPENSION MEMBERS FROM STICK

BACKGROUND OF THE INVENTION

1. Field of the Invention

The present invention relates to a sausage suspension member and a method and an apparatus for suspending a sausage on suspension members from a stick.

2. Description of the Related Art

A chain of linked sausages which are manufactured by a stuffing apparatus, in terms of the size of its one link, has, for example, a stuffed diameter of 1 cm to 35 cm and a stuffed length of 3 cm to 20 cm. In order to be heat treated in a smokehouse, this sausage, after being suspended in loop form from suspension members of a conveyor connected to the stuffing apparatus, is manually or automatically delivered to a stick for heat treatment and is suspended from the stick. The following apparatuses are known as this type of apparatus.

A suspension member which is used in an apparatus for manually suspending from a stick the sausage suspended from the suspension members of the conveyor is disclosed in JP-A-1999-9180 (hereinafter referred to as Patent Document 1).

A suspension member 31 of Patent Document 1 has a projecting portion 34A extending upwardly from a narrow portion 33 for catching a chain-like stuffed casing 35 and a guide portion 34B for placing thereon the stuffed casing caught by the narrow portion 33 and for enlarging the loop opening angle of the stuffed casing, thereby facilitating the operation of inserting a stick 36 into the looped stuffed casing 35 by the operator.

Apparatuses are known which automatically deliver to a stick a sausage suspended from suspension members of a conveyor without requiring manual operation by further widening the loop and thereby making reliable the automatic insertion of the stick into the loop.

Among the above-described automatic apparatuses, disclosed in JP-A-2003-70416 (hereinafter referred to as Patent Document 2) and WO 2009/501118 (hereinafter referred to as Patent Document 3) are apparatuses in which a suspension member of a conveyor is pivoted downwardly to thereby allow a sausage suspended from a suspension member to automatically drop onto a stick disposed at a position below the suspension member in a state in which the stick is kept stationary in a vertical direction.

The apparatus described in Patent Document 2 has a suspension member 102 provided pivotally on an arm member 101. To make the insertion of a stick 8 reliable, the suspension member 102 has placing portions 102D and 102E for placing a link 6B and a link 6C thereon to suspend a loop 6L in a widened form. The suspension member 102 pivots downwardly to allow the loop 6L to drop onto the stick 8.

The apparatus described in Patent Document 3 includes suspension members 34 each adapted to pivot between an angle for receiving a strand 50 of linked sausage and an angle for delivering the strand 50 onto a receiving stick 60; an end guide rail 28 and a side guide rail 30 which are each adapted to come into contact with a lower section 46 of the suspension member to set the suspension member 34 at a receiving angle; and a cam guide 32 adapted to come into contact with an upper section 44 of the suspension member to set the suspension member 34 at a delivering angle. The suspension member 34 pivots upwardly and outwardly to receive the strand 50 and subsequently the suspension member at the receiving angle with the strand 50 placed thereon pivots downwardly and inwardly to deliver the strand 50 onto the receiving stick 60.

In contrast to the above-described Patent Documents 2 and 3, disclosed in JP-A-2003-158991 (hereinafter referred to as Patent Document 4) is an apparatus which automatically delivers a sausage suspended from a suspension member onto the stick by upwardly moving the stick instead of downwardly pivoting the suspension member of a conveyor.

To allow a stick 10 to be inserted into a loop 9C without error, a suspension member 4 of Patent Document 4 has a narrow portion 4C for catching a sausage 9 as well as a first guide portion 4D1 for placing thereon a link 9B1 of the sausage 9 suspended from the narrow portion 4C and a second guide portion 4D2 for placing a link 9B2 thereon, and thereby suspends the sausage 9 by widening it at a wide angle. A discharging stick 10-1 which moves below a guide section 4D of the suspension member 4, while being raised, receives from the suspension member 4 a twisted portion 9A2 which is one twisted portion below a twisted portion 9A1 being caught by the suspension member 4.

U.S. Pat. No. 8,151,973B2 (hereinafter referred to as Patent Document 5) discloses an apparatus for automatically deliver a sausage suspended from suspension members of a conveyor onto the stick by upwardly moving the stick and downwardly pivoting the suspension members.

In the apparatus described in Patent Document 5, as link support members 110 pivot laterally outwardly and upwardly about a pivot axis 122, a lower portion 114 on which an outer link of the sausage suspended from a holding portion 124 is placed is raised upwardly and outwardly to cause a looped chain 32 suspended from a link support portion to be opened up in a direction in which the loop is removed (column 2, lines 1 to 11; column 14, lines 15 to 22; and column 14, lines 58 to 65). Next, as the link support members 110 are caused to backwardly pivot laterally inward, the lower portion 114 is lowered, and a stick 48 inserted into the opened loops is lifted laterally outward, whereby a connecting portion between the outer link placed on the lower portion 114 and a link therebelow is lifted by the stick 48, thereby removing the looped chain 32 from the link support members 110 and suspending it from the stick 48 (column 15, lines 31 to 41; column 23, line 57 to column 24, line 24).

However, with the apparatus disclosed in Patent Document 1, the guide portion 34B is provided on one side with an opening angle θ with respect to a vertical direction, and if the opening angle θ of the guide portion 34B is made excessively large to simplify the inserting operation of the stick 36, the stuffed casing becomes difficult to be placed on the guide portion 34B when the twisted portion of the stuffed casing supplied from a stuffing apparatus is suspended from the suspension member 31.

With the apparatus disclosed in Patent Document 2, if the sliding of the loop 6L on a suspension member 11 is poor due to, for example, the suspension members 102 at a narrow mounting interval Z, a long time is likely required for the loop 6L to drop from the suspension member 11 and large variations are likely produced in the dropping time among the multiplicity of suspension members 11.

With the apparatus disclosed in Patent Document 3, since a guide bar 51 is disposed at a position of a long distance substantially corresponding to the length of a sausage link from a mounting stem 48 (FIG. 2), a required pivot angle of the suspension member 34 for removing the sausage from the mounting stem 48 is large, so that it takes much more time in delivering a loop 56 onto the receiving stick 60.

With the apparatus disclosed in Patent Document 4, since the discharging stick 10-1 retains the twisted portion 9A2 located below the narrow portion 4C, a large stroke of stick raising and much more time are required for transferring the sausage onto the stick. Further, since the discharging stick 10-1 abuts against the twisted portion 9A2 while pushing up the link 9B2 (FIG. 4-2 and FIG. 4-3), if the sausage to be produced is changed to a more elongated link 9B, the link 9B2 can possibly be bent at the portion pushed up by the stick 10-1.

With the apparatus of Patent Document 5, since the loop chain 32 is opened by pivoting in the loop removing direction the lower portion 114 of the link support member 110 with the link placed thereon (FIGS. 22A and 22B), the lower portion 114 acts as an obstacle, and therefore the stick 48 is unable to receive a connector piece 218 (FIG. 20D) suspended from the holding portion 124. The apparatus of Patent Document 5 in which a connector piece which is one below the connector piece 218 is lifted requires a longer distance for raising the stick 48 and a longer time to remove the connector piece 218 from the link support member 110. In cases where the production is changed to a sausage with a shorter link length, replacement to the link support members 110 each having the lower portion 114 of a length corresponding to the shorter link length is necessary in order to lift the connector piece which is one below the connector piece 218 by the stick 48 (column 21, lines 51 to 55), so that the versatility is low.

In addition, with this known apparatus, since the downward and inward pivoting of the link support members 110 is effected by a third member 332 and a bar 346 which clamp the link support members 110 from upper and lower sides as well as two pneumatic cylinders 334 and 336 (column 22, line 10 to column 23, line 29), so that the apparatus becomes complex.

SUMMARY OF THE INVENTION

The present invention has been devised in view of the above-described circumstances, and its object is to provide a sausage suspension member suitable for automation and to provide a sausage suspension member as well as a method and an apparatus for suspending a sausage on suspension members from a stick, which are capable of transferring sausages of a wide range of sizes from the suspension members onto the stick in a short time, and which are high in productivity and versatility.

To attain the above object concerning the suspension member in accordance with the present invention, there is provided a sausage suspension member for suspending a sausage consisting of a multiplicity of links connected by twisted portions, comprising: a suspending portion for suspending the sausage in a state of being divided into an outer link and an inner link, the suspending portion being formed at a position lower than a pivot axis; and an opening portion formed at a position lower than the suspending portion to allow the inner link suspended from the suspending portion to be placed thereon, wherein the suspension member is adapted to undergo primary pivoting whereby the opening portion with the inner link placed thereon is moved about the pivot axis laterally inwardly so as to enlarge an interval between the inner link and the outer link in preparation for the insertion, between the outer link and the inner link, of a stick which is being raised upwardly and laterally outwardly to suspend the sausage after the insertion, and after the primary pivoting, the suspension member is adapted to undergo secondary pivoting whereby the opening portion with the inner link placed thereon is moved about the pivot axis laterally inwardly so as to move laterally inwardly away from the stick in a state of being inserted between the inner link and the outer link.

According to the suspension member in accordance with the present invention, while maintaining an attitude for affording such an opening angle of the opening portion that the sausage is easily and reliably placed thereon, the suspension member abuts against the sausage fed out from the stuffing apparatus and places the inner link of the sausage reliably on the opening portion, and the suspension member subsequently undergoes primary pivoting laterally inwardly before the insertion of the stick and lifts up the inner link. Therefore, the interval between the outer link and the inner link can be further enlarged reliably in preparation for the insertion of the stick.

In order to cope with the occurrence of disengagement of the inner link from the opening portion due to such as the end processing of the sausage after the inner link of the sausage fed out from the stuffing apparatus has been placed on the opening portion, the above-described suspension member in accordance with the present invention may undergo pivoting in the laterally outward direction, which is an opposite direction to that of the above-described primary pivoting, to lower the opening portion, and may subsequently undergo pivoting in the laterally inward direction to upwardly raise the opening portion.

In addition, in contrast to the fact that the stick after being inserted into the loops is raised laterally outwardly, the suspension member undergoes the above-described primary pivoting in the inward direction before the insertion of the stick, so that the heightwise position of the stick for insertion in the loops can be disposed at a position close to the suspending portion of the suspension member. As a result, the loops can be removed from the suspension members at a short stick raising distance.

To attain the above object concerning the suspending method in accordance with the present invention, there is provided a method of suspending from a stick a sausage which consists of a multiplicity of links connected by twisted portions and is suspended in loop form from suspension members each including a suspending portion formed at a position lower than a pivot axis and an opening portion formed at a position lower than the suspending portion, comprising the steps of: suspending the sausage from the suspending portion of each of the suspension members in a first attitude in a state in which the sausage is divided into an outer link and an inner link; causing each of the suspension members in the first attitude to change its attitude to a second attitude by primary pivoting whereby the opening portion is moved about the pivot axis laterally inwardly so as to make an interval between the outer link and the inner link placed on the opening portion of the suspension member in the second attitude larger than the interval therebetween in the first attitude; causing each of the suspension members in the second attitude to move along a longitudinal direction of the stick supported by stick supporting means in a state in which the inner link is placed on the opening portion to thereby allow the stick to be inserted between the inner link and the outer link; raising upwardly and laterally outwardly the stick in a state of being inserted between the inner link and the outer link of a loop group consisting of a multiplicity of loops; causing each of the suspension members in the second attitude to change its attitude to a third attitude by secondary pivoting whereby the opening portion with the inner link placed thereon is moved so as to move laterally inwardly away from the stick in the state of being inserted between the inner link and the outer link of the loop group consisting of the multiplicity of loops; and removing the sausage suspended from the suspension members by the upward and laterally outward raising of the stick and the secondary pivoting of the suspension members so as to suspend the sausage from the stick.

According to the above-described method of suspending a sausage from a stick in accordance with the present invention, while maintaining an attitude for affording such an opening angle of the opening portion that the sausage is easily and reliably placed thereon, the suspension member abuts against the sausage fed out from the stuffing apparatus and places the sausage reliably on the opening portion, and after the sausage has been placed, the suspension member undergoes primary pivoting laterally inwardly before the insertion of the stick and lifts up the inner link. Therefore, the interval between the outer link and the inner link can be further enlarged reliably in preparation for the insertion of the stick, with the result that the insertion of the stick can be facilitated.

In contrast to the fact that the stick after being inserted into the loops is raised laterally outwardly after the insertion of the stick, the suspension member undergoes secondary pivoting in a laterally inward direction which is the same direction as that of the primary pivoting, so that the heightwise position of the stick for insertion in the loops can be disposed at a position close to the suspending portion of the suspension member. As a result, the loops can be removed from the suspension members at a short stick raising distance, so that stick discharging can be completed in a short time.

The moving of the opening portion "away from the stick in a state of being inserted between the inner link and the outer link" may be effected with respect to the stick before being raised upwardly and laterally outwardly, or the stick being raised upwardly and laterally outwardly, or, still further, the stick after being raised upwardly and laterally outwardly.

Namely, in accordance with the present invention, since the secondary pivoting of the suspension member, which is carried out after the aforementioned primary pivoting before the insertion of the stick, is effected in the same direction as that of primary pivoting, the suspension member is moved away from the stick in one of the aforementioned three states in a short time without colliding against the stick which is close to the suspending portion of the suspension member. Therefore, it is possible to make short the stroke of stick raising for removing the sausage loops from the suspension members and suspending them from the stick.

The twisted portion to be retained by the stick is preferably the twisted portion which is being retained by the suspending portion; however, depending on such as the size of the sausage and the size of the loop, there are cases where the twisted portion to be retained by the stick is preferably a twisted portion which is one below the twisted portion which is being retained by the suspending portion, i.e., a twisted portion formed at the other end portion of the link at one end portion of which the twisted portion being retained by the suspending portion is formed. The selection of one of these hanging positions is possible by the selection of one of the aforementioned states of the stick at the start of secondary pivoting.

According to the method of suspending a sausage from a stick in accordance with the present invention, since secondary pivoting of the suspension members is effected with respect to the stick, the timing at which the twisted portions are disengaged from the suspension members and are retained by the stick can be substantially fixed, and the occurrence of the sausage which fails to be removed from the suspension members can be prevented.

In addition, according to the method of suspending a sausage from a stick in accordance with the present invention, since the twisted portions of the sausage being caught by the suspending portions of the suspending members can be delivered onto the stick, even if the link length of the sausage to be produced undergoes a large change, it is possible to avoid the trouble in which the link is suspended from the stick by being bent midway in the link, and the manual operation of correcting the misplacement of the sausage on the stick is unneeded, so that productivity improves. Furthermore, even if a large change is made in the link length of the sausage, the positional change of stick raising and the replacement of the suspension members are unneeded.

The above-described method of suspending a sausage from a stick may further comprise the step of causing the suspension members to undergo pivoting in the laterally outward direction, which is an opposite direction to that of the above-described primary pivoting, to lower the opening portion, and to subsequently undergo pivoting in the laterally inward direction to upwardly raise the opening portion, in order to cope with the occurrence of disengagement of the inner link from the opening portion due to such as the end processing of the sausage.

To attain the above object concerning the suspending apparatus in accordance with the present invention, there is provided a suspending apparatus for suspending from a stick a sausage suspended from suspension members, comprising: suspension members for suspending a sausage consisting of a multiplicity of links connected by twisted portions; a conveyor for moving the suspension members provided on the conveyor; suspension member pivoting means for causing the suspension members to pivot; and a stick discharging device for discharging a stick, each of the suspension members including a suspending portion adapted to suspend therefrom the sausage in a state of being divided into an outer link and an inner link and formed at a position lower than a pivot axis of the suspension member and an opening portion formed at a position lower than the suspending portion to allow the inner link suspended from the suspending portion to be placed thereon, wherein the suspension member pivoting means includes: a sliding guide member for guiding the suspension members such that the opening portion with the inner link placed thereon is moved about the pivot axis laterally inwardly so as to enlarge an interval between the inner link and the outer link in preparation for the insertion, between the outer link and the inner link, of the stick which is being raised upwardly and laterally outwardly to suspend the sausage after the insertion; and a pivot driving member for causing a multiplicity of the suspension members to pivot about the pivot axis laterally inwardly so as to move the opening portion with the inner link placed thereon laterally inwardly away from the stick in a state of being inserted between the inner link and the outer link.

The above-described sliding guide member may have a guide portion for effecting pivoting in the laterally outward direction, which is an opposite direction to that of the above-described primary pivoting, to lower the opening portion, and for subsequently effecting pivoting in the laterally inward direction to upwardly raise the opening portion.

The suspending apparatus in accordance with the present invention is used to carry out the above-described method of suspending from a stick a sausage, and produces operational effects substantially identical to those of this method.

In accordance with the present invention, it is possible to provide a sausage suspension member suitable for automation and provide a method and an apparatus for suspending a sausage from a stick, which are capable of transferring the sausage suspended from the suspension members of the conveyor onto the stick in a short time in the production of sausages of a wide range of sizes, and which are high in productivity and versatility.

BRIEF DESCRIPTION OF THE DRAWINGS

FIGS. 4A and 4B are enlarged views of essential portions shown in FIG. 1, in which FIG. 4A is a plan view illustrating an attitude maintaining unit in a suspension and end processing zone, and FIG. 4B is a front elevational view thereof;

FIGS. 6A, 6B, and 6C are enlarged views of essential portions and illustrate the suspension members, in which FIG. 6A is a plan view, FIG. 6B is front elevational view, and FIG. 6C is a side elevational view illustrating respective attitudes of the suspension member;

FIGS. 7A and 7B are enlarged views of essential portions shown in FIG. 1, in which FIG. 7A is a plan view illustrating an attitude maintaining unit in a loop opening zone, and FIG. 7B is a front elevational view thereof;

FIGS. 9A and 9B are enlarged views of essential portions shown in FIG. 1, in which FIG. 9A is a plan view illustrating an attitude maintaining unit in a stick discharging zone, and FIG. 9B is a front elevational view thereof;

DESCRIPTION OF THE PREFERRED EMBODIMENTS

Hereafter, a description will be given of the preferred embodiments of the present invention with reference to the accompanying drawings. It should be noted that the present invention is not limited to the illustrated preferred embodiments.

Figure 1:
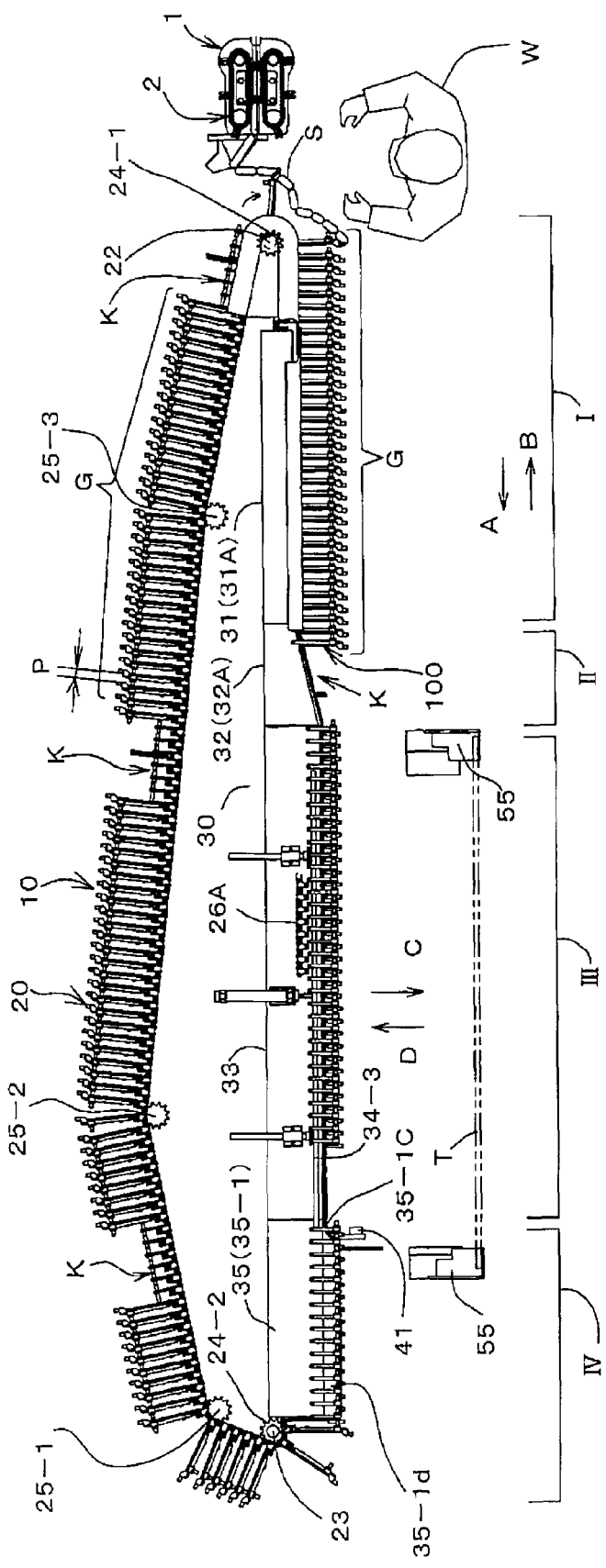
FIG. 1 is a plan view illustrating an apparatus in accordance with a first embodiment of the present invention.
Figure 2:
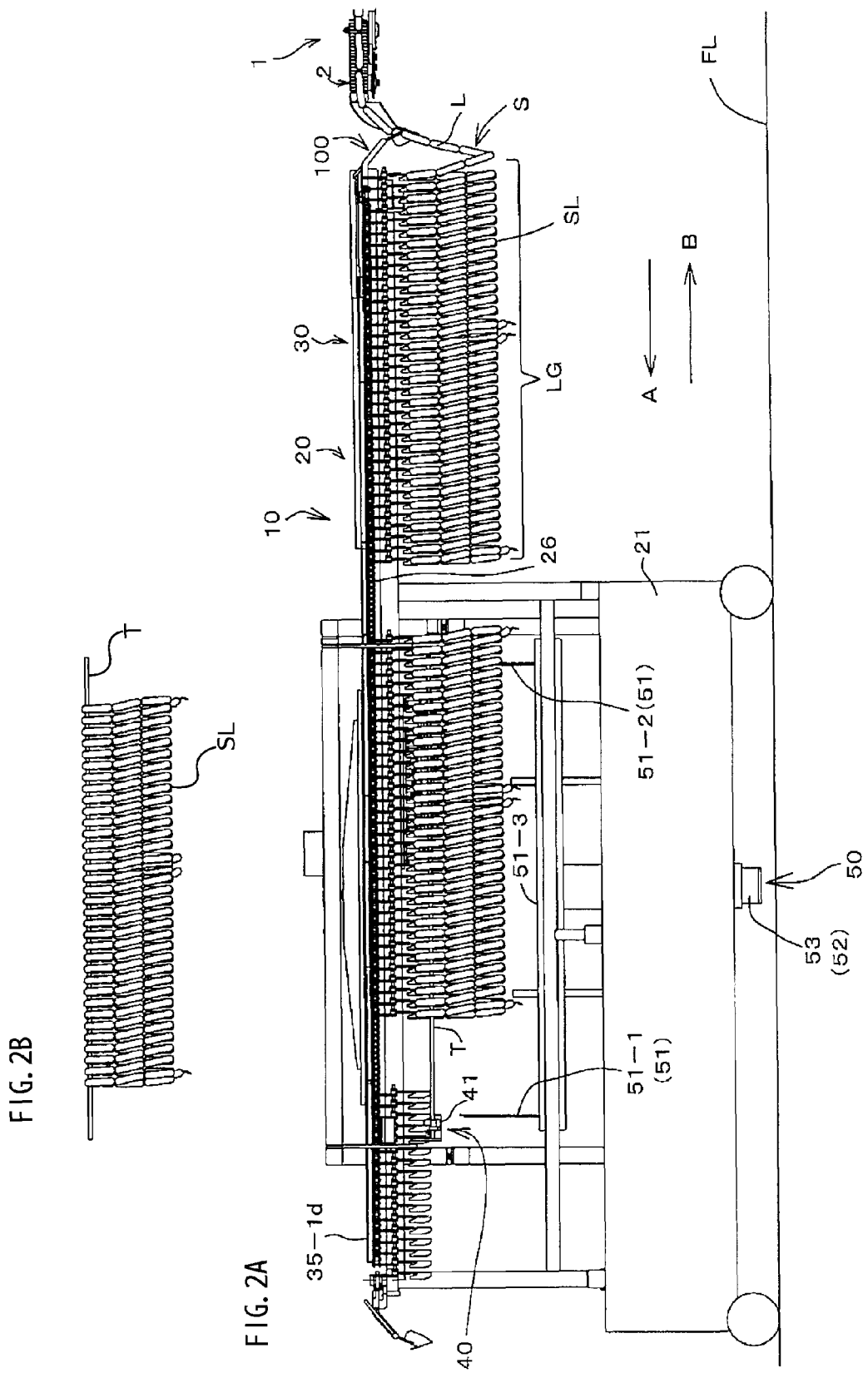
FIGS. 2A and 2B are side elevational views of FIG. 1.
Figure 3:
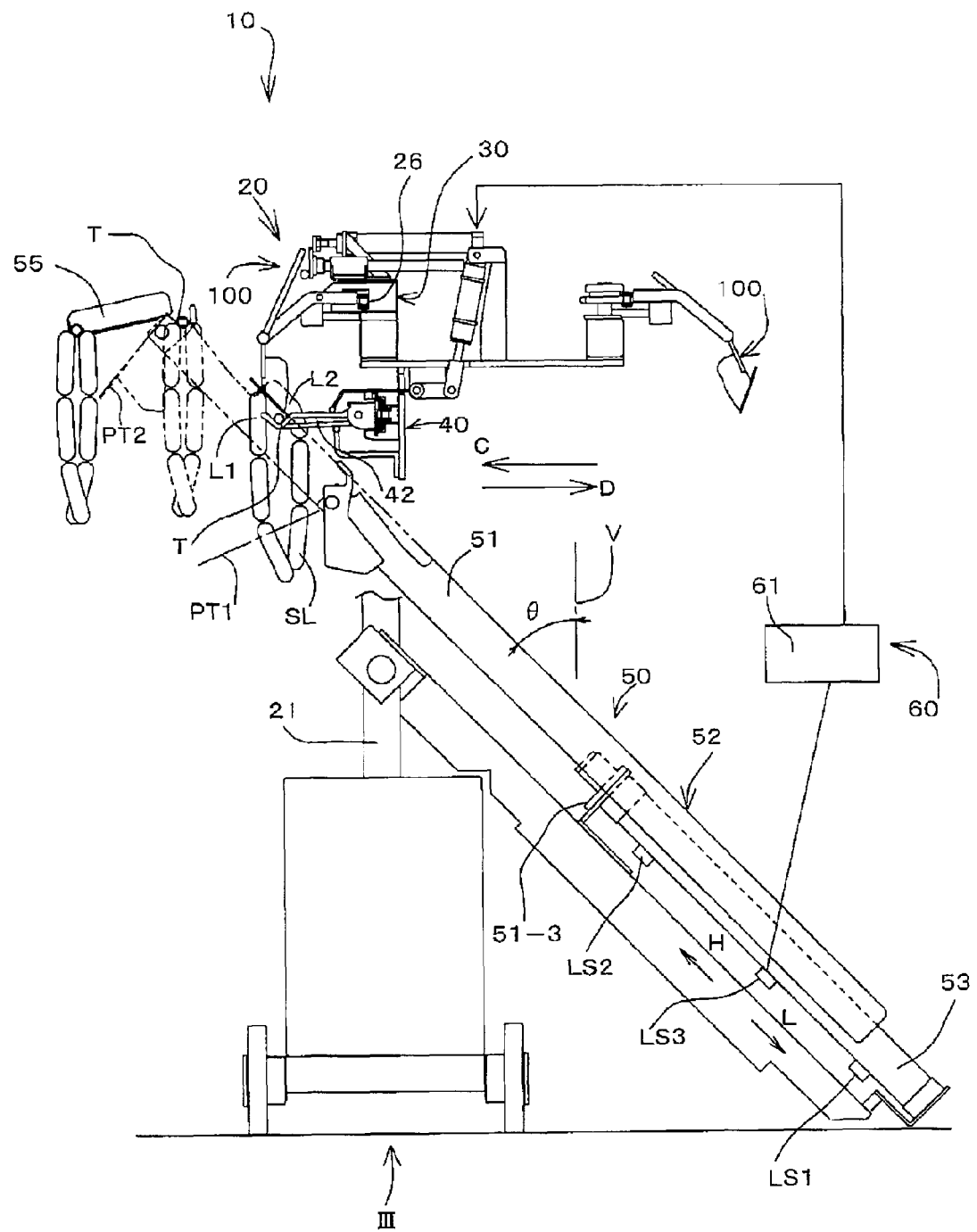
FIG. 3 is a side elevational view of FIG. 1 and mainly illustrates a stick discharging device and a pivot start timing changing means.

First, a description will be given of an apparatus of a first embodiment of the present invention illustrated in FIGS. 1 through 12. Referring to FIGS. 1 to 3, reference numeral 1 denotes a sausage stuffing apparatus, reference numeral 10 denotes a suspending apparatus for suspending a sausage from a stick. It is assumed that the side in the direction of arrow A is a downstream side, and the side in the direction of arrow B is an upstream side. Reference character T denotes an elongated stick member which extends in the longitudinal direction and used for heat treatment of the sausage. It is assumed that, in a plan view, the side in the direction in which the stick T is discharged laterally of the longitudinal direction of the stick T is a laterally outward side, and the side in the opposite direction thereto is a laterally inward side, and that the laterally outward side is in the direction of arrow C, and the laterally inward side is in the direction of arrow D (see FIG. 1).

The sausage stuffing apparatus 1 is an apparatus in which an emulsified or minced sausage material, i.e., the content of a sausage S, is stuffed into a tubular casing for sausage and is twisted to form the sausage S consisting of a multiplicity of links L connected at twisted portions Qn, and this sausage S is fed toward the suspending apparatus 10 for suspending the sausage S from the stick T. The sausage stuffing apparatus 1 is provided with a conveying means 2 having a known linking chain, a linking belt, or a conveying belt for conveying the chain of sausage S.

The suspending apparatus 10 is disposed on the downstream side (in the direction of arrow A) of the sausage stuffing apparatus 1 and is provided with a conveyor 20, a stick supporting device 40, and a stick discharging device 50.

Zones designated at reference numerals I to IV are provided for the suspending apparatus 10 in order toward the downstream side. Reference numeral I denotes a zone where the sausage S fed out from the sausage stuffing apparatus 1 is suspended by a suspension member group G of the conveyor 20, and a loop group LG of the suspended sausage S is subjected to end processing by an operator W (this zone will be hereafter referred to as the "suspension and end processing zone"). Reference numeral II denotes a zone where respective sausage loops SL are sequentially opened before the insertion of the stick T into the loop group LG of the sausage S (this zone will be hereafter referred to as the "loop opening zone"). Reference numeral III denotes a zone where the stick T is inserted into the loop group LG, and the loop group LG is transferred onto the stick T and is discharged from the conveyor 20 (this zone will be hereafter referred to as the "stick discharging zone"). Reference numeral IV denotes a zone where the attitude of suspension members 100 with the loop group LG removed therefrom is changed for the return of the suspension members to the "suspension and end processing zone" (this zone will be hereafter referred to as the "attitude resetting zone").

The above-described conveyor 20 includes a frame 21 installed on a floor FL; a wrapping connector moving body 26 which circulates by linearly moving from a rotating shaft 22 provided on the frame 21 toward the downstream side (in the direction of arrow A), by undergoing rotation at a rotating shaft 23 for reversing the moving direction, and by returning to the upstream side (in the direction of arrow B); a multiplicity of suspension members 100 which are provided on the wrapping connector moving body 26 pivotally in a vertical plane so as to suspend the sausage S; and a suspension member pivoting means 30 which is actuated to cause the suspension members 100 to pivot in the vertical plane.

The wrapping connector moving body 26 is configured to circulatingly move by being wound around wheel bodies 24-1 and 24-2 respectively mounted on the rotating shafts 22 and 23 which are located at two positions spaced apart on the downstream side and whose axes are set in the vertical direction, as well as wheel bodies 25-1, 25-2, and 25-3. This wrapping connector moving body 26, which is linearly trained between the wheel bodies 24-1 and 24-2, has a linearly moving area 26A for linearly moving to the downstream side between the wheel bodies 24-1 and 24-2. In this embodiment, the wrapping connector moving body 26 is constituted by a chain, and the wheel bodies 24-1 and 24-2 as well as 25-1, 25-2, and 25-3 are constituted by sprockets; however, a belt and pulleys may be used in substitution therefor.

A plurality of suspension member groups G, each having the suspension members 100 in a number corresponding to a predetermined number of loops of the sausage S which are suspended from the stick T, are sequentially mounted on the wrapping connector moving body 26 with the interposition of suspension member absent zones K where the suspension members 100 are not mounted on the wrapping connector moving body 26. However, this suspending apparatus 10 may be configured such that the suspension members 100 are mounted over the entire length of the wrapping connector moving body 26 at predetermined pitches P without providing these suspension member absent zones K.

The suspension member 100 held in a first attitude shown in FIGS. 5 and 6A to 6C has a hook portion 102 and a driven portion 103 and is mounted on a suspension member bracket 101 pivotally about a pivot axis X in the vertical plane. The pivot axis X, i.e., a horizontal pivot axis X in this example, for pivoting the suspension member 100 is positioned in parallel with the aforementioned linearly moving area 26A and at a predetermined place on a laterally outward side (in the direction of arrow C) with respect to that linearly moving area 26A, as shown in FIG. 6A.

Figure 5:
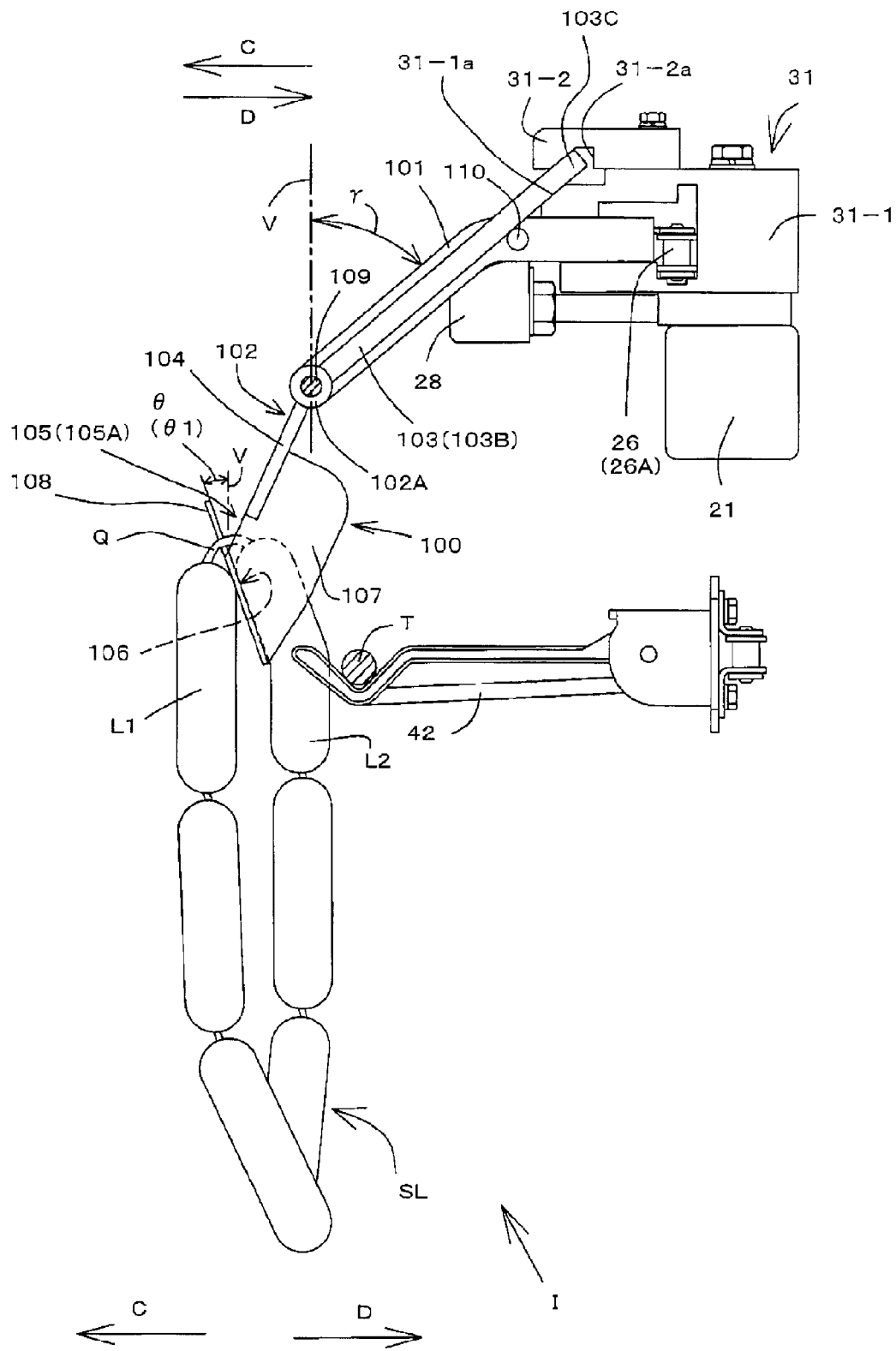
FIG. 5 is an enlarged view of essential portions shown in FIGS. 4A and 4B and is a side elevational view illustrating the attitude maintaining unit and suspension members.

The hook portion 102 shown in FIG. 5 has a round rod-shaped downwardly extending portion 104 located below the horizontal pivot axis X as well as a suspending portion 105, an opening portion 106, and a restricting portion 107, and the suspending portion 105, the opening portion 106, and the restricting portion 107 are formed in a bent plate-shaped body provided at a lower portion of the downwardly extending portion 104. The suspending portion 105 consists of a V-shaped portion 105A for retaining a highermost twisted portion Q which connects an outer link L1 and an inner link L2 of the sausage loop SL, and the V-shaped portion 105A is formed by a projecting portion 108 projecting in such a manner as to be inclined from its trough portion 105A1 (see FIG. 6C) upwardly and laterally outwardly (in the direction of arrow C) at an angle $\theta$ with respect to the vertical line and by the restricting portion 107 perpendicular to the projecting portion 108.

The opening portion 106 is formed in such a manner as to extend diagonally downwardly and laterally inwardly (in the direction of arrow D) at the aforementioned angle $\theta$, has a flat lower surface portion 111 continuous to the projecting portion 108 which is inclined at the same angle, and is formed integrally with the projecting portion 108. This angle $\theta$ (hereinafter referred to as the "opening angle") of the opening portion 106 is set to an angle, e.g., 20 degrees, which allows the inner link L2 to be easily and reliably placed on the opening portion 106 when the suspension member 100 in the suspension and end processing zone I abuts against the sausage S to suspend the sausage S from the suspension member 100. The restricting portion 107 restricts the upstream-side position of the inner link L2 to allow the inner link L2 to be placed on the opening portion 106 when it is suspended. This angle $\theta$ of the opening portion 106 prevents the inner link L2 placed on the opening portion 106 from dropping from the opening portion 106 to the downstream side.

A hole in which a horizontal pivot shaft 109, i.e., here a connecting pin 109, on the horizontal pivot axis X is fitted is formed in an upper end portion 102A of the hook portion 102, such that the hook portion 102 is pivotally connected to the suspension member bracket 101 by the connecting pin 109 secured to the suspension member bracket 101.

The driven portion 103 is constituted by a round rod member 103B secured to the upper end portion 102A of the hook portion 102, and the round rod member 103B extends diagonally upwardly toward the wrapping connector moving body 26 at an angle $\gamma$ formed with respect to a vertical line V. A driven end portion 103C, which is its terminating end portion, is configured to engage an attitude maintaining unit 31.

The suspension member bracket 101 is constituted by a plate-like rod member having a horizontal portion 101a and a downwardly inclined portion 101b shown in FIG. 6C, and is fixed to the wrapping connector moving body 26 in a state in which it projects from the aforementioned linearly moving area 26A laterally outwardly (in the direction of arrow C). In addition to the aforementioned connecting pin 109, a stopper pin 110 for preventing the downward pivoting of the round rod member 103B serving as the driven portion 103 is fixed to the suspension member bracket 101.

Referring also to FIGS. 4A and 4B, the suspension member bracket 101 is so adapted that its horizontal portion 101a is supported horizontally by a first sliding support member 27 and a second sliding support member 28. The change in position of the connecting pin 109 on the horizontal pivot axis X is thereby restrained.

Referring to FIG. 1, the suspension member pivoting means 30 holds the suspension members 100 at, or changes its attitude to, a predetermined attitude by engaging the suspension members 100 which are pivotable about the horizontal pivot axis X in the vertical plane. The suspension member pivoting means 30 has attitude maintaining units fixed to the frame 21 of the conveyor 20, and the attitude maintaining units are constituted by a plurality of attitude maintaining units 31, 32, 33, and 35. However, the number of this division and the positions of division may be set appropriately apart from them. The attitude maintaining units 31, 32, 33, and 35 are respectively positioned in correspondence with the above-described suspension and end processing zone I, loop opening zone II, stick discharging zone III, and attitude resetting zone IV so as to maintain or change the attitude of the suspension members 100 which move toward the downstream side.

The attitude maintaining unit 31 (see FIGS. 4A, 4B, and 5) in the suspension and end processing zone I has a sliding guide member 31-1 and a sliding guide member 31-2 which are arranged in face-to-face relation in the vertical direction; the attitude maintaining unit 32 (see FIGS. 7A, 7B, and 8) in the loop opening zone II has a sliding guide member 32-1; the attitude maintaining unit 33 (see FIGS. 9A, 9B, and 10) in the stick discharging zone III has a sliding guide member 33-1 and a pivoting means 34; and the attitude maintaining unit 35 (see FIG. 1) in the attitude resetting zone IV has a sliding guide member 35-1.

A sliding guide portion 31-1a and a guide groove 31-2a, which are respectively formed in the sliding guide member 31-1 and the sliding guide member 31-2 in the suspension and end processing zone I, define the position of the driven end portions 103C of the round rod members 103B serving as the driven portions 103 to thereby hold the suspension members 100 in the first attitude for forming a first opening angle $\theta 1$ in terms of the opening angle $\theta$ of the opening portion 106. The first attitude of the suspension member 100 is an attitude in which the opening angle $\theta$ is set to such an angle, i.e., the first opening angle $\theta 1$, that allows the inner link L2 to be easily and reliably placed on the opening portion 106 in the process of suspending the sausage S fed out from the sausage stuffing apparatus 1, and that first opening angle θ1 is, for example, 30 degrees (see FIG. 5).

Figure 7A:
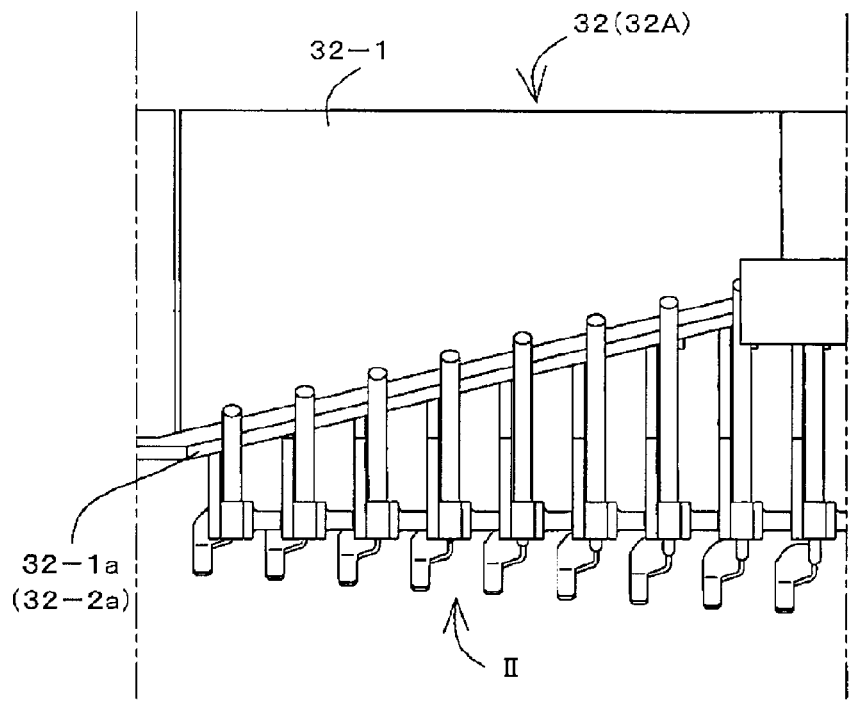
Figure 7B:
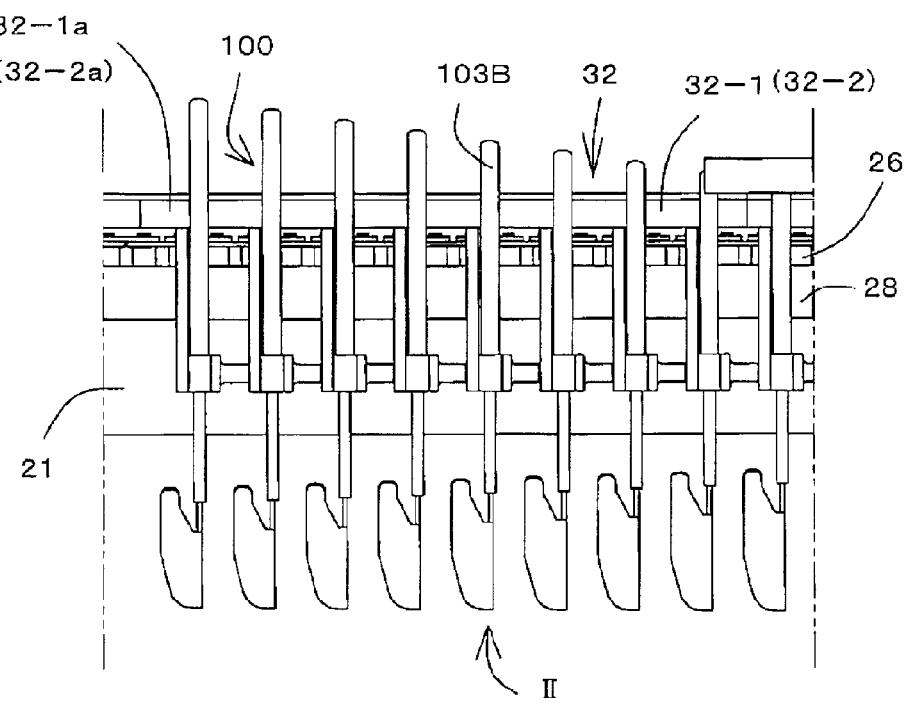

A cam portion 32-1a of the sliding guide member 32-1 in the loop opening zone II, shown in FIGS. 7A and 7B, causes the attitude of the suspension members 100 to change from the first attitude to a second attitude in which the opening angle θ assumes a second opening angle θ2 which is larger than the first opening angle θ1. It should be noted that, depending on the magnitude of a generated moment, the pivoting of the suspension members 100 to the second attitude can start before the round rod member 103B is pushed by the cam portion 32-1a.

Figure 8:
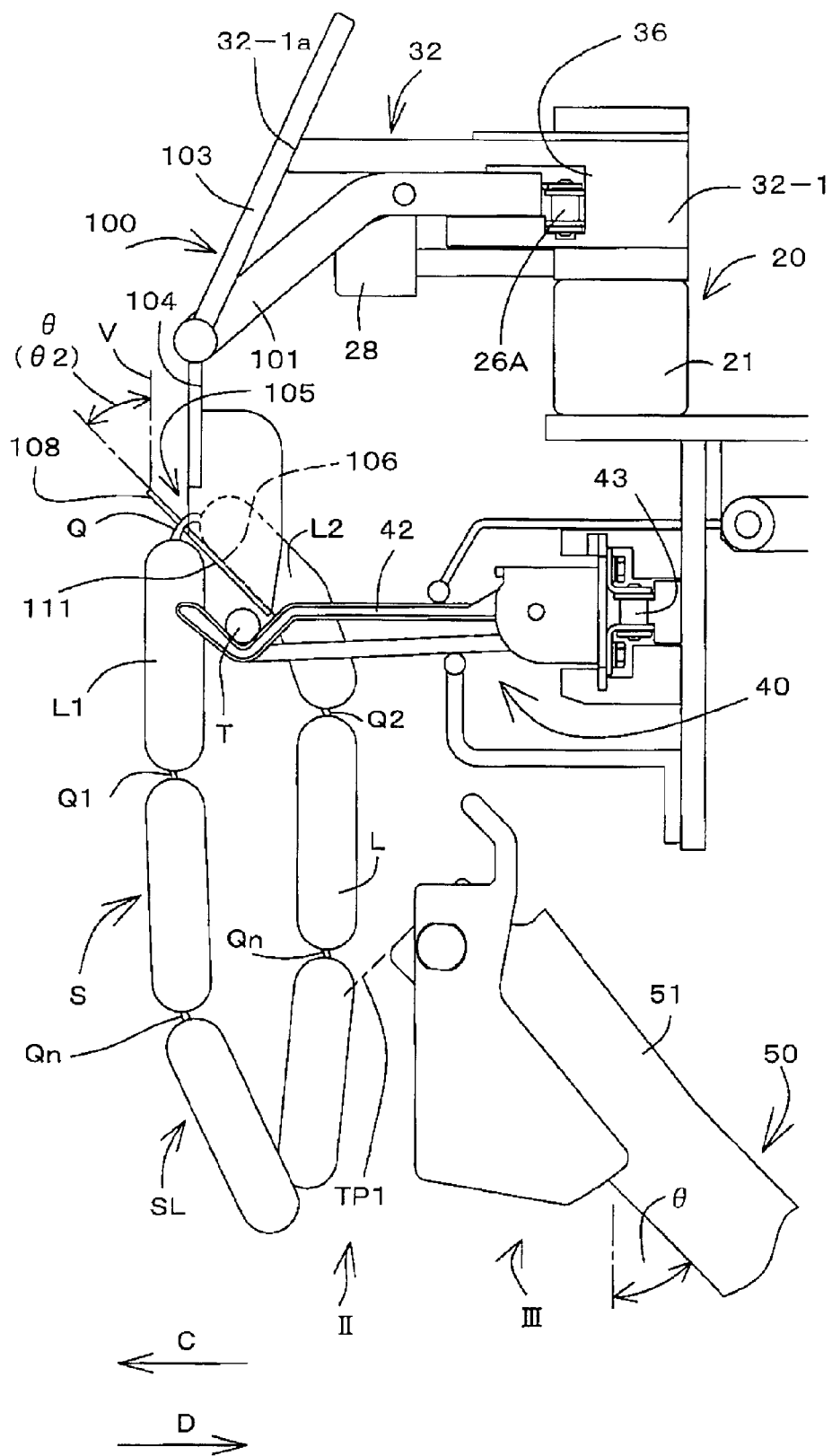
FIG. 8 is an enlarged view of essential portions shown in FIGS. 7A and 7B and is a side elevational view illustrating the suspension member in a second attitude at a terminal position of the loop opening zone.
Figures 9A, 9B:
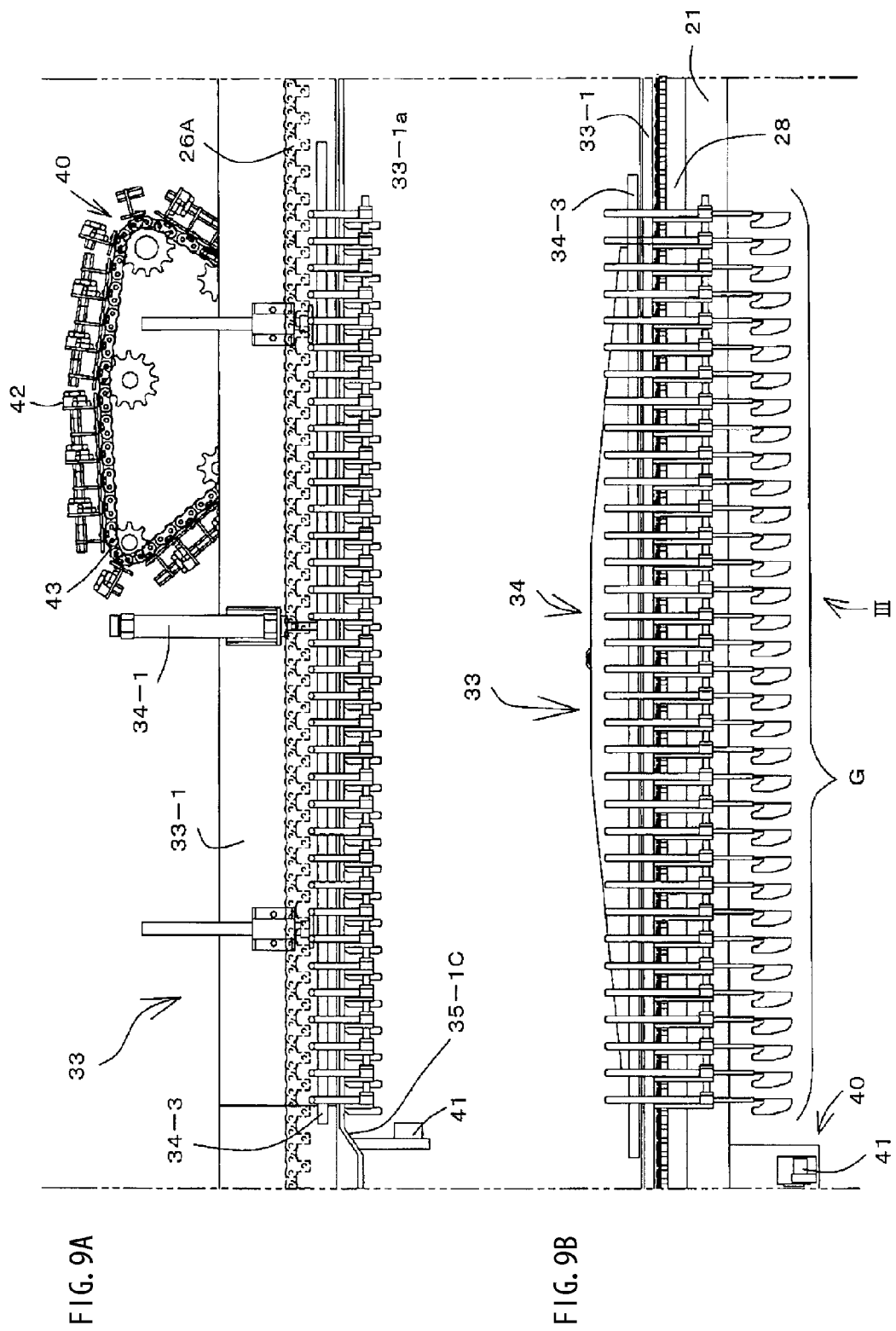
Figure 10:
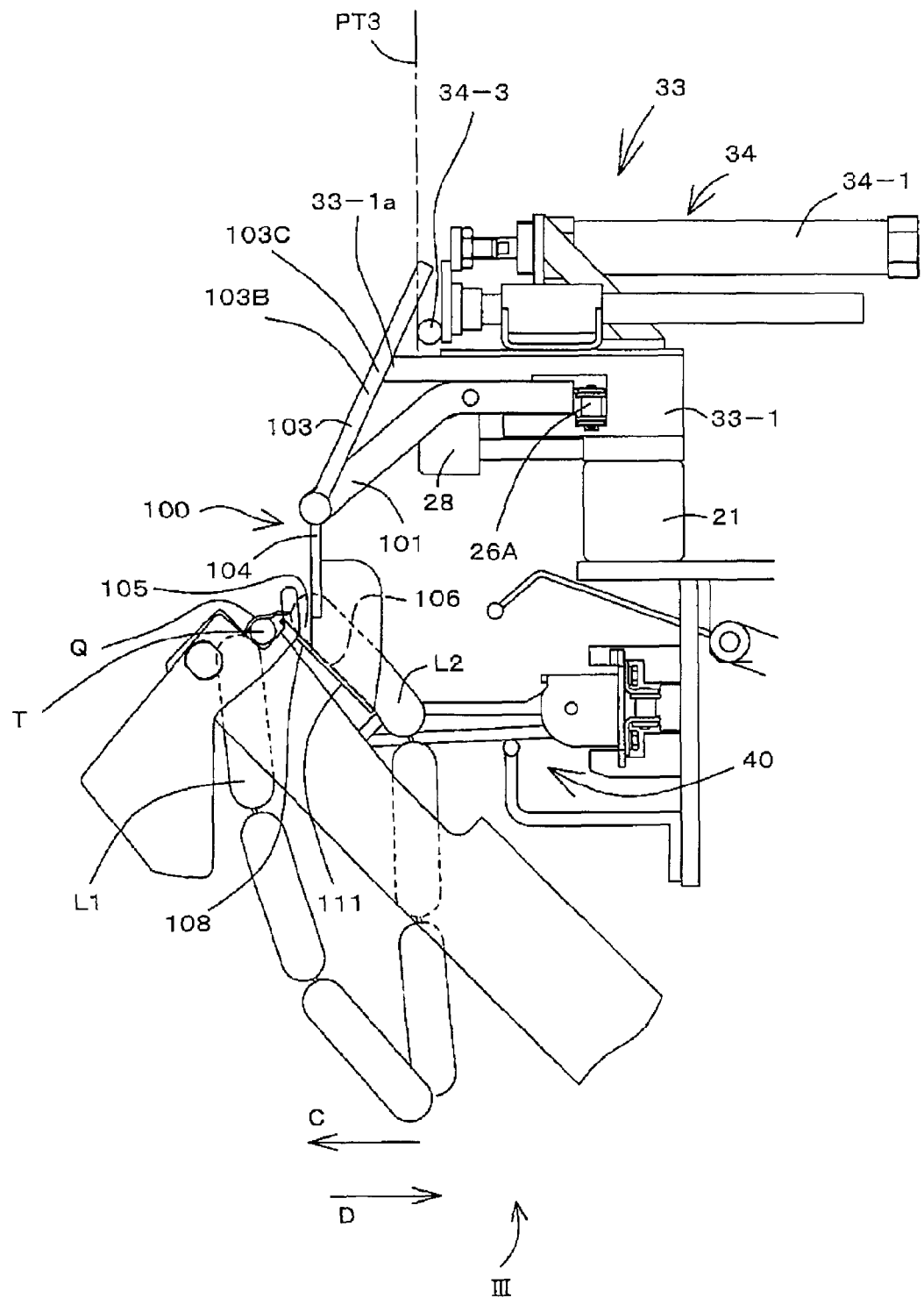
FIG. 10 is a side elevational view explaining the operation and illustrating the suspension member in the second attitude and a stick discharging member being raised in the stick discharging zone.

Referring to FIGS. 9A, 9B, and 10, a straight advance guide portion 33-1a of the sliding guide member 33-1 positioned in the stick discharging zone III is disposed in parallel with the linearly moving area 26A of the wrapping connector moving body 26, and prevents the round rod member 103B which moves in a state of engagement with the straight advance guide portion 3-1a from pivoting laterally inwardly (in the direction of arrow D) so as to hold the suspension members 100 in the second attitude. The second attitude of the suspension members 100 is an attitude in which the opening angle θ, i.e., the second opening angle θ2, is set to such an angle that allows the stick T supported by a stick supporting device 40 to be inserted reliably in the sausage loop SL, and that second opening angle θ2 is, for example, 45 degrees (see FIG. 8).

Since the arrangement provided is such that the downwardly extending portion 104 is set in a substantially vertical state, and a moment for pivoting the downwardly extending portion 104 laterally outwardly (in the direction of arrow C) is produced by the total weight of the link L applied to the opening portion 106, the suspension members 100 can be held in the second attitude only by the abutment of the round rod member 103B against the straight advance guide portion 33-1a (see FIG. 10).

The pivoting means 34 of the attitude maintaining unit 33 positioned in the stick discharging zone III is for moving the opening portion 106 with the inner link L2 of the sausage S placed thereon laterally inwardly (in the direction of arrow D) away from the stick T in the state of being inserted between the outer link L1 and the inner link L2 by pivoting the suspending portion 105 of each suspension member 100 in the second attitude laterally inwardly (in the direction of arrow D).

Figure 11:
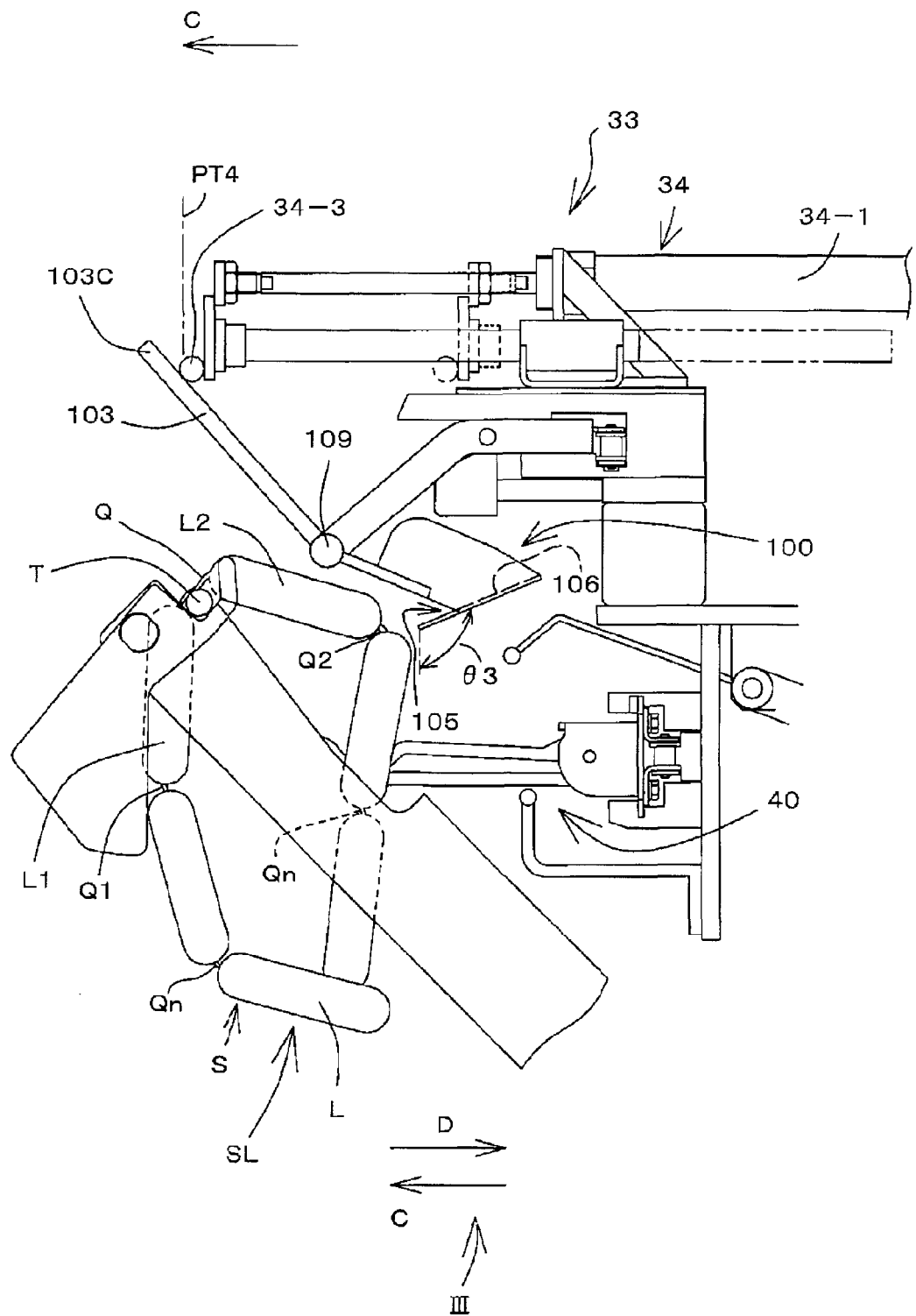
FIG. 11 is a side elevational view explaining the operation concerning FIG. 10 and illustrating the suspension member in a third attitude and the stick discharging member which moves the stick with the sausage disengaged therefrom.

Referring to FIGS. 9 to 11, the pivoting means 34 has a long bar-shaped pivot driving member 34-3 which extends in parallel with the linearly moving area 26A and is actuated to abut against the driven end portions 103C of all the driven portions 103 of the suspension member group G positioned in the stick discharging zone III. The pivot driving member 34-3 is adapted to reciprocate between a standby position PT3 (see FIG. 10) and a pivot completion position PT4 (see FIG. 11) in a direction perpendicular to the linearly moving area 26A by an air cylinder 34-1, and the movement of the pivot driving member 34-3 to the pivot completion position PT4 moves all the driven portions 103 of the suspension member group G laterally outwardly (in the direction of arrow C) to thereby cause the attitude of the suspension members 100 to change from the second attitude to a third attitude for forming a third opening angle θ3 which is larger than the second opening angle θ2 (see FIG. 11).

The third attitude of the suspension members 100 which changed from the second attitude in the stick discharging zone III is an attitude in which the opening angle θ, i.e., the third opening angle θ3, is set to such an angle that accelerates the falling of the inner link L2 from the downstream side of the opening portion 106 during its change and speeds up the separation timing of the hook portion 102 from the sausage loop SL, and the third opening angle θ3 is, for example, 100 degrees. The aforementioned dropping of the inner link L2 can be accelerated by making the opening angle θ3 large.

Referring to FIGS. 1 and 2A, the sliding guide member 35-1 positioned in the attitude resetting zone IV has a cam portion 35-1c which is also shown in FIG. 9A, and the cam portion 35-1c changes the attitude of the suspension member 100 from the third attitude to a fourth attitude by pushing the driven portion 103 laterally outwardly (in the direction of arrow C). A straight advance guide portion 35-1d maintains the fourth attitude, and the hook portion 102 of the suspension member 100 in the fourth attitude passes above a below-described stick front portion support member 41 (see FIGS. 9A and 9B) to avoid the stick front portion support member 41.

Upon passing the attitude maintaining unit 35, the suspension members 100 pivot from the fourth attitude to the first attitude, move to the upstream side (in the direction of arrow B), as shown in FIG. 1, while maintaining the first attitude, and then return to the suspension and end processing zone I. It should be noted that the attitude maintaining units may be configured such that the suspension members 100 are reset to the first attitude in the suspension and end processing zone I.

In the apparatus in accordance with this first embodiment, since the changing and holding of the suspension members 100 from the first attitude to the fourth attitude are effected by the engagement of the attitude maintaining units 31, 32, 33, and 35 with only the driven portions 103, it is possible to configure the suspension member pivoting means 30 having a simple structure.

The stick supporting device 40 is disposed along the linearly moving area 26A in the range of the linearly moving area 26A of the wrapping connector moving body 26, and has the stick front portion support member 41, shown in FIG. 2A, for supporting a front portion of the stick T and a stick rear portion support member 42, shown in FIG. 9A, for supporting a rear portion of the stick T. As shown in FIG. 8, the stick supporting device 40 supports the stick T horizontally along the linearly moving area 26A so that the rear portion of the stick T is disposed at a position which is higher than both a twisted portion Q1 of the outer link L1 and a twisted portion Q2 of the inner link L2 and which is located between the outer link L1 and the inner link L2 which are suspended from the suspension member 100 in the second attitude.

As shown in FIG. 3, the stick discharging device 50 is disposed in the stick discharging zone III, and includes a pair of stick discharging members 51 (a front stick discharging member 51-1 and a rear stick discharging member 51-2) for holding the stick T inserted in the loop group LG suspended from the suspension member group G which reached the stick discharging zone III and for raising that stick T diagonally upwardly and laterally outwardly (in the direction of arrow C); a connecting member 51-3 (see FIG. 2A) for connecting the front stick discharging member 51-1 and the rear stick discharging member 51-2; a stick discharging member driving means 52 (which is an air cylinder unit 53 in this embodiment, but may be a known electric motor) for upwardly driving the connecting member 51-3; and a receiving stand 55 for receiving the stick T discharged from the conveyor 20 by the pair of stick discharging members 51.

It should be noted that although, in the stick discharging device 50 of the apparatus in accordance with this embodiment, the stick discharging member driving means 52 is disposed below the suspension members 100, the stick discharging device in accordance with the present invention may be configured as disclosed in FIGS. 10 and 11 of JP-A-2006-197935, i.e., the stick discharging member driving means may be configured to be disposed above the suspension members. With the stick discharging device in accordance with the present invention in the case where this configuration is provided, since the pair of stick discharging members which starts to be raised from a lowered end position raises the stick upwardly, the time during which the pair of stick discharging members hampers the movement of the suspension members and the sausage loops which move downstream is short. Accordingly, if the stick discharging member driving means is disposed above the suspension members of the present invention which pivot in such a manner as to move away from the stick, the just-mentioned hampering time due to the pair of stick discharging members can be further reduced, making it possible to enhance the operation rate of the apparatus. If the apparatus in accordance with this embodiment, for which the configuration in which the pair of stick discharging members 51 are raised in the suspension member absent zone K can be adopted, is provided with the above-described configuration in which the stick discharging member driving means is disposed above the suspension members, it is possible to further enhance the operation rate of the apparatus.

The air cylinder unit 53 shown in FIG. 3 is provided with a detection switch LS1 for detecting a lowered end of the pair of stick discharging members 51 and a detection switch LS2 for detecting a raised end thereof as well as a detection switch LS3 for detecting the height of the pair of stick discharging members 51 being upwardly moved from the lowered end.

Referring to FIGS. 3 and 8, the pair of stick discharging members 51 is disposed at a standby position PT1 below the stick supporting device 40 in a state in which pair of stick discharging members 51 is inclined upwardly at the same angle as the second opening angle θ2 of the suspension members 100 being held in the second attitude, i.e., at 45 degrees in this example.

In the apparatus shown in FIG. 8, the stick T, which is supported by the stick supporting device 40, is disposed in close proximity to the hook portion 102 of the suspension member 100 held in the second attitude to cause the stick T to abut against a vicinity of an upper end portion of the outer link L1 suspended from the suspending portion 105.

A pivot start timing changing means 60 shown in FIG. 3 is for changing the twisted portion Qn, which is retained by the stick T, of the sausage S by changing the heightwise position of the stick T, which is being raised, at the point of time when the suspension members 100 in the second attitude start pivoting to the third attitude, and includes the detection switch LS3 provided on the air cylinder unit 53 and a control means 61 for outputting a start command to the suspension member pivoting means 30 in response to the detection signal from the detection switch LS3. By changing the mounting position of the detection switch LS3 in an H direction or in an L direction, the pivoting of the suspension members 100 to the third attitude is started at a higher stick height position in the H direction and at a lower stick height position in the L direction, respectively.

The pivot start timing changing means 60 may be configured to be provided with the control means 61 having a timer unit which outputs a start command to the suspension member pivoting means 30 after the lapse of a desired time duration from the start of raising the pair of stick discharging members 51.

Hereafter, a description will be given of the form of delivery of the sausage loop to the stick T which can be adopted by the setting of the pivot start timing changing means 60.

Referring to FIG. 8, the stick T which is raised at the angle θ by the pair of stick discharging members 51 moves in close proximity to, and in parallel with, the lower surface portion 111 of the opening portion 106 and the projecting portion 108 of each of the suspension members 100 held in the second attitude. At the point of time when the stick T has abutted against the outer link L1, or when the stick T has pushed the highermost twisted portion Q up to the upper end of the projecting portion 108, each of the suspension members 100 in the second attitude starts secondary pivoting, and causes the opening portion 106 to move laterally inwardly (in the direction of arrow D) away from the stick T which is raised diagonally upwardly and laterally outwardly (in the direction of arrow C), as shown in FIG. 11, to thereby deliver the highermost twisted portion Q onto the stick T. In either case, the secondary pivoting is started at the point of time when the twisted portion Q has not been removed from the projecting portion 108.

With the apparatus shown in FIG. 10, the secondary pivoting of the suspension members 100 is not started at the point of time when the twisted portion Q has not been removed from the projecting portion 108, and the secondary pivoting of the suspension members 100 to the third attitude is started after the twisted portion Q has been removed from the projecting portion 108, as shown in FIG. 11. The start of the secondary pivoting may be effected with respect to the stick T being raised, or may be effected with respect to the stick T which reached the raised end position and stopped being raised.

Figure 12:
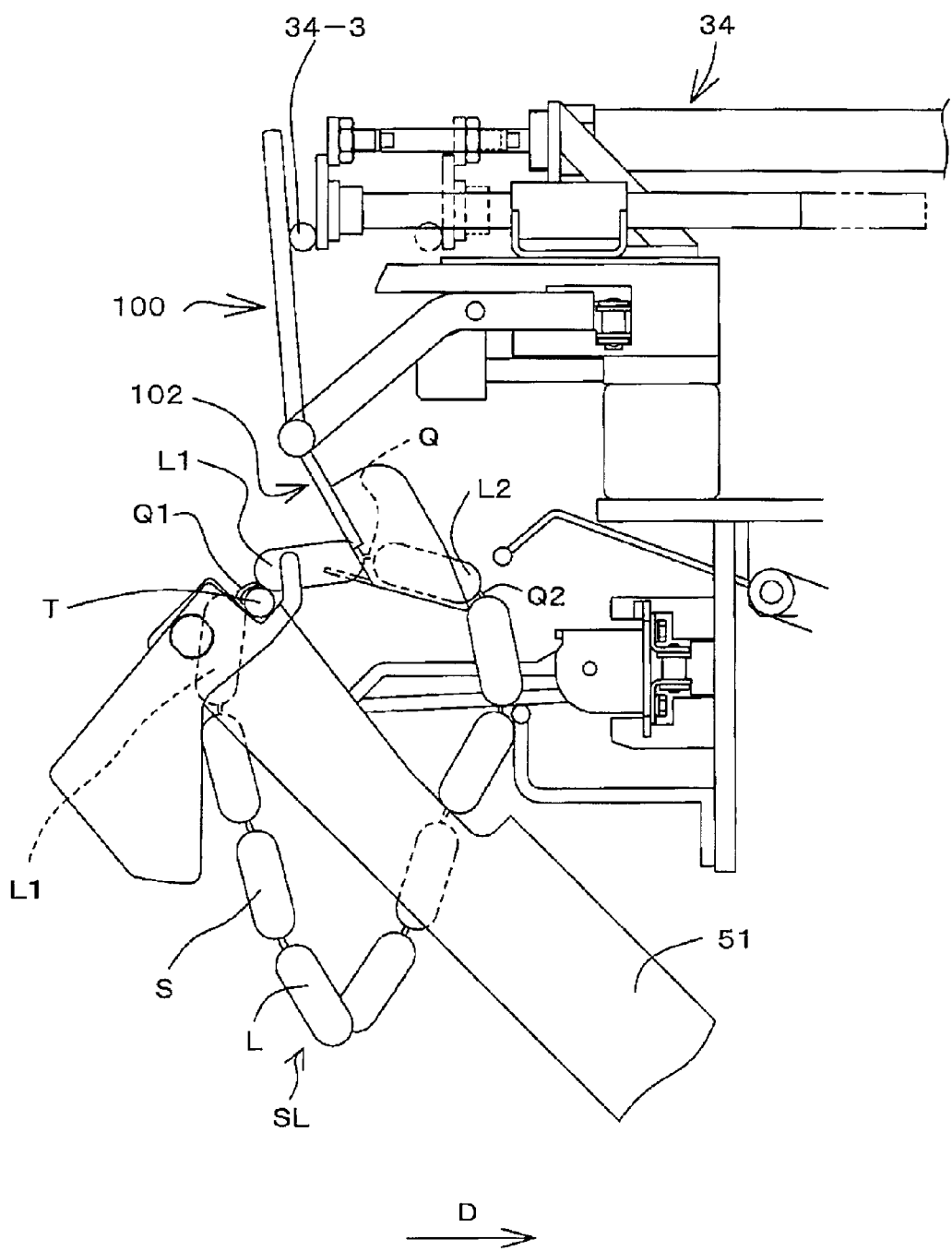
FIG. 12 is a side elevational view explaining the operation and illustrating the suspension member in the third attitude and the stick discharging member which started to be raised after changing to the third attitude in the stick discharging zone.

With the apparatus shown in FIG. 12, as the secondary pivoting of the suspension members 100 is started at the point of time before the stick T abuts against the outer link L1, the twisted portion Q1, which is the one immediately below the highermost twisted portion Q suspended from the hook portion 102 which is pivoted laterally inwardly (in the direction of arrow D), i.e., the twisted portion Q1 (see FIG. 8) which is the first one on the lower side of the highermost twisted portion Q among the plurality of twisted portions Qn located below the highermost twisted portion Q, is abutted against by the stick T which is being raised diagonally upwardly, and the aforementioned twisted portion Q1 is taken up by the stick T which is being further raised. In the production in which the sausage S comprising links L each having a nearly spherical shape with a short length and a large diameter is suspended from the stick T with a large diameter, there can be cases where it is more preferable to deliver the aforementioned twisted portion Q1 rather than the highermost twisted portion Q onto the stick T in preventing the misplacement of the sausage loop SL onto the stick T.

Thus, the stick T is capable of retaining a desired twisted portion whether it be the highermost twisted portion Q or the twisted portion Q1 which is the one immediately below the highermost twisted portion Q to remove the sausage loop SL from the suspension member 100.

In the apparatus in accordance with the first embodiment of the present invention thus configured, the sausage S is suspended from the stick T, for example, in the following procedure.

(1) In the suspension and end processing zone I, each suspension member 100, while maintaining the first attitude, suspends the sausage S fed out from the conveying means 2 (see FIG. 1). The sausage S with the inner link L2 placed on the opening portion 106 is suspended from the suspending portion 105 in such a manner as to be divided into the outer link L1 and the inner link L2 (see FIG. 5).

(2) In the loop opening zone II, in the state in which the inner link L2 is placed on the opening portion 106, each suspension member 100 undergoes primary pivoting about the horizontal pivot shaft 109 laterally inwardly (in the direction of arrow D) to thereby change its attitude from the first attitude to the second attitude and raise the opening portion 106. The interval between the inner link L2 placed on the opening portion 106 in the second attitude and the outer link L1 becomes larger than that of the first attitude, and the opening portion 106 moves laterally inwardly (in the direction of arrow D) up to the position of the stick T on the stick rear portion support member 42 to adjust the outer link L1 and the inner link L2 which are suspended from the suspending portion 105 to the position of the stick T (see FIG. 8).

(3) In the stick discharging zone III, each suspension member 100 moves while maintaining the second attitude with the inner link L2 placed on its opening portion 106, and the arrangement of the suspension member group G in the stick discharging zone III and the insertion of the stick T into the loop group LG are completed (see FIGS. 1 and 8).

(4) In the stick discharging zone III, with respect to the inner link L2 which is placed on the opening portion 106 and is pulled upwardly by the stick T being raised diagonally upwardly and laterally outwardly (in the direction of arrow C) while retaining the highermost twisted portion Q, each suspension member 100 undergoes secondary pivoting about the horizontal pivot shaft 109 laterally inwardly (in the direction of arrow D), so that the attitude of the suspension member 100 changes to the third attitude to further raise the opening portion 106 (see FIG. 11).

(5) In the stick discharging zone III, by virtue of interactive cooperation between the stick T being raised diagonally upwardly and the hook portion 102 moving away from the stick T laterally inwardly (in the direction of arrow D), the inner link L2 is disengaged from the opening portion 106 moving away from the stick T or the opening portion 106 of the suspension member 100 set in the third attitude, and each sausage loop SL including the disengaged inner link L2 and the links L strung therebelow is thus removed from between the suspension members 100 and is suspended from the stick T (see FIG. 11).

(6) The stick T (see FIG. 2B) with the sausage loops SL suspended therefrom is delivered from the pair of stick discharging members 51 to the receiving stand 55 at the raised end position PT2 of the pair of stick discharging members 51 (see FIG. 3). Thus, the stick discharging device 50 discharges the stick T from the conveyor 20.

Next, a description will be given of an apparatus in accordance with a second embodiment shown in FIG. 13. Although, with the apparatus of the first embodiment already described, the suspension members 100 are moved while maintaining the first attitude over the entire region of the suspension and end processing zone I, the apparatus of the second embodiment is configured such that, in the suspension and end processing zone I, the hook portions 102 of the suspension members 100 held in the first attitude are pivoted about the horizontal pivot shafts 109 laterally outwardly (in the direction of arrow C) during movement toward the downstream side (in the direction of arrow A) to undergo a change in their attitude (see FIG. 13), and the suspension members 100 subsequently advance toward the loop opening zone II while maintaining the changed attitude.

Referring to FIG. 1, in accordance with the above-described configuration the apparatus of the second embodiment is configured differently from the apparatus of the first embodiment, and includes an attitude maintaining unit 31A positioned in the suspension and end processing zone I and an attitude maintaining unit 32A positioned in the loop opening zone II.

Figure 13:
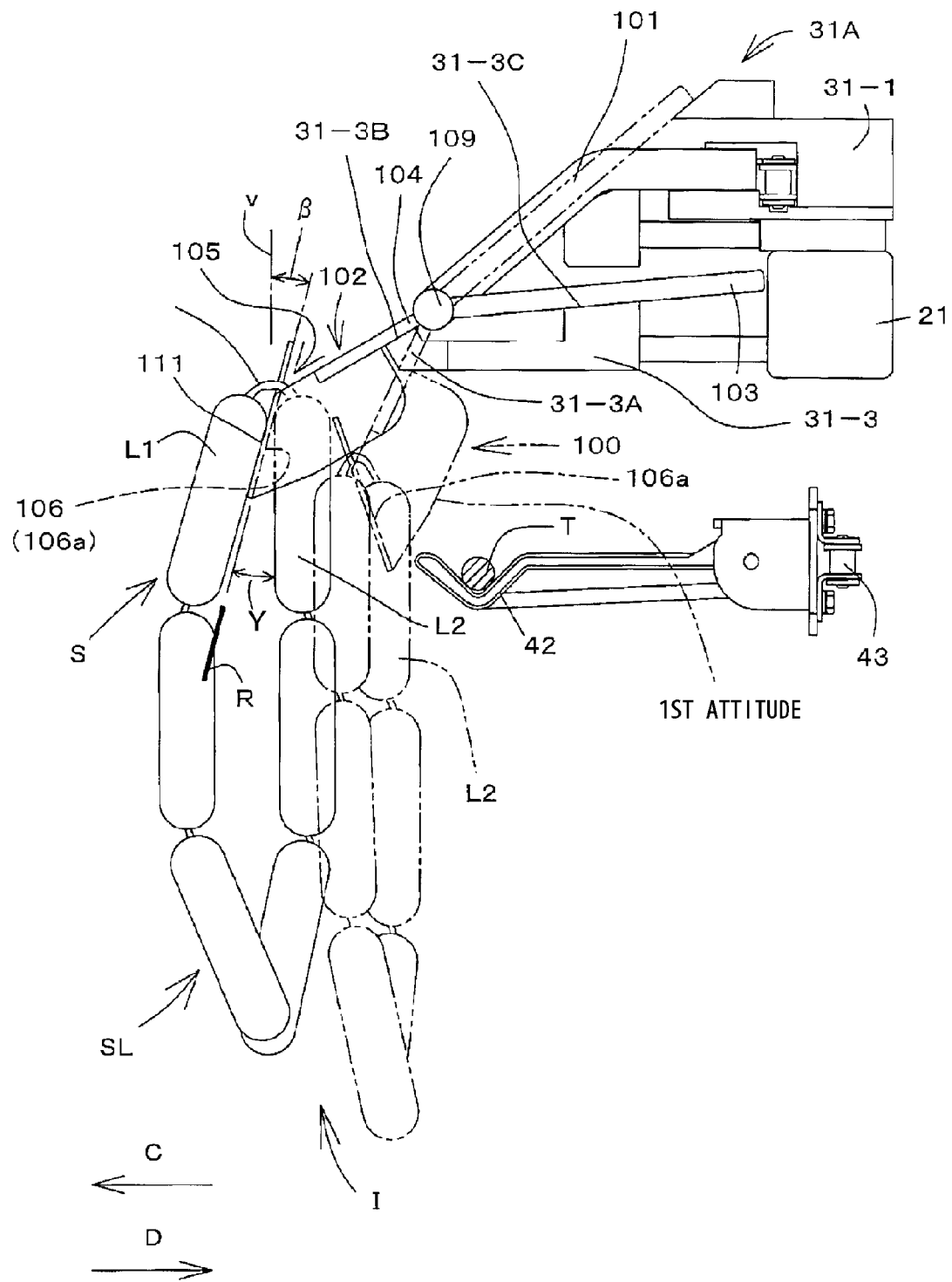
FIG. 13 is an enlarged side elevational view of essential portions and illustrates an apparatus in accordance with a second embodiment of the present invention in which the suspension member is held in an attitude different from that in the apparatus of the first embodiment.

The attitude maintaining unit 31A shown in FIG. 13 has a sliding guide member 31-3 in which a cam portion 31-3A and straight advance guide portions 31-3B and 31-3C are formed, and the sliding guide member 31-3 is mounted on the frame 21. The cam portion 31-3A is adapted to engage the downwardly extending portion 104 of the suspension member 100 in the first attitude to pivot the opening portion 106 laterally outwardly (in the direction of arrow C) so as to change the attitude of the suspension member 100; the straight advance guide portion 31-3B supports the downwardly extending portion 104 from below; and the straight advance guide portion 31-3C supports the driven portion 103 from below to thereby maintain the attitude of each suspension member 100 in the above-described changed attitude. In the suspension and end processing zone I, the sliding guide member 31-3 is disposed along the movement of the suspension members 100 in the changed attitude toward the downstream side (in the direction of arrow A) (see FIG. 1).

The cam portion 31-3A pivots the suspension member 100 up to a position R where an interval Y is formed between the inner link L2 and a link placing surface 106a of the opening portion 106, i.e., in this embodiment, up to a position where an inclination angle $\beta$ of the link placing surface 106a becomes 15 degrees. By virtue of this arrangement, even if there is an inner link L2 which failed to be placed on the link placing surface 106a in the first attitude such as shown in FIG. 13, as the attitude of the suspension member 100 is changed toward the laterally outward side (in the direction of arrow C), the inner link L2 suspended from the suspending portion 105 is swung toward the upstream side (in the direction of arrow B), and is thereby capable of undergoing return movement to the position where it faces the link placing surface 106a with the interval Y therebetween.

The timing of generation of this return movement of the inner link L2 toward the upstream side (in the direction of arrow B) is not fixed according to the size of the pitch P between the suspension members, the form in which the loop SL is suspended from the stick T, the size and shape of the link L of the sausage S, and the like. In a case where this return movement does not occur while the inner link L2 moves toward the loop opening zone II in the suspension and end processing zone I, the return movement is generated in the loop opening zone II.

Referring also to FIGS. 7A and 7B, as for the attitude of the suspension members 100 in the above-described changed attitude, by virtue of engagement between the round rod member 103B and a cam portion 32-2a of a sliding guide member 32-2 provided in the attitude maintaining unit 32A in the loop opening zone II, the link placing surface 106a at the position R starts to move laterally inwardly (in the direction of arrow D) in the state in which the inner link L2 opposes the link placing surface 106a with the interval Y therebetween, and subsequently the suspension members 100, after returning to the first attitude, undergo a change from the first attitude to the second attitude. Thus, also with the apparatus of the second embodiment, in the same way as the apparatus of the first embodiment, primary pivoting from the first attitude to the second attitude is effected for enlarging the interval between the outer link L1 and the inner link L2 in preparation for the insertion of the stick T into the sausage loop SL (see FIG. 8).

The apparatus in accordance with this second embodiment having the configuration described above includes:

the suspension members 100 for suspending the sausage S consisting of the multiplicity of links L connected by the twisted portions Qn, each of the suspension members 100 having the suspending portion 105 adapted to suspend the sausage S in a state of being divided into the outer link L1 and the inner link L2 and formed at a position lower than the pivot axis X and the opening portion 106 formed at a position lower than the suspending portion 105 to allow the inner link L2 suspended from the suspending portion 105 to be placed thereon;

first means for causing the opening portion 106 of each of the suspension members 100 with the sausage S suspended therefrom to pivot about the pivot axis X laterally outwardly, for causing the laterally outwardly pivoted opening portion 106 of each of the suspension members 100 to pivot about the pivot axis X laterally inwardly, and for causing the laterally inwardly pivoted opening portion 106 of each of the suspension members 100 to further pivot about the horizontal pivot shaft such that the interval Y between the outer link L1 and the inner link L2 placed on the opening portion 106 being raised becomes larger than the interval Y between the outer link L1 and the inner link L2 placed on the opening portion 106 at the time when the sausage S was suspended therefrom;

second means for causing each of the suspension members 100 which changed its attitude to an attitude for enlarging the interval Y between the outer link L1 and the inner link L2 to move along the longitudinal direction of the stick T supported by stick supporting means in a state in which the inner link L2 is placed on the opening portion 106 to thereby allow the stick T to be inserted between the outer link L1 and the inner link L2;

third means for raising diagonally upwardly and laterally outwardly the stick T in a state of being inserted between the outer link L1 and the inner link L2 of a loop group LG; and fourth means for causing each of the suspension members 100 to further change its attitude by pivoting whereby the opening portion 106 with the inner link L2 placed thereon is moved so as to move laterally inwardly away from the stick T in the state of being inserted between the outer link L1 and the inner link L2 of the loop group LG, thereby further raising the opening portion 106.

The first means has the attitude maintaining unit 31A and the attitude maintaining unit 32A; the second means has the sliding guide member 33-1 of the attitude maintaining unit 33; the third means has the stick discharging device 50; and the fourth means has the pivoting means 34 of the attitude maintaining unit 33. The sliding guide member 33-1, the stick discharging device 50, and the pivoting means 34 are configured on the basis of those of the apparatus in accordance with the first embodiment.

It should be noted that, in the apparatus of this second embodiment, since the opening portion 106 of the suspension member 100 which is in the first attitude is pivoted laterally outwardly (in the direction of arrow C), the suspension member bracket 101 in the apparatus of the second embodiment is not provided with the stopper pin 110 provided in the apparatus of the first embodiment.

The apparatus of this second embodiment is capable of carrying out the following suspending method.

A method of suspending from the stick T the sausage S which consists of the multiplicity of links L connected by the twisted portions Qn and is suspended in loop form from the suspension members 100 each including the suspending portion 105 formed at a position lower than the pivot axis X and the opening portion 106 formed at a position lower than the suspending portion 105, comprising the steps of:

suspending the sausage S from each of the suspension members 100 in a state in which the sausage S is divided into the outer link L1 and the inner link L2;

causing the opening portion 106 of each of the suspension members 100 with the sausage S suspended therefrom to pivot about the pivot axis X laterally outwardly;

causing the laterally outwardly pivoted opening portion 106 of each of the suspension members 100 to pivot about the pivot axis X laterally inwardly;

causing the laterally inwardly pivoted opening portion 106 of each of the suspension members 100 to further pivot about the pivot axis such that the interval Y between the outer link L1 and the inner link L2 placed on the opening portion 106 being raised becomes larger than the interval Y between the outer link L1 and the inner link L2 placed on the opening portion 106 at the time when the sausage S was suspended therefrom;

causing each of the suspension members 100 which changed its attitude to an attitude for enlarging the interval Y between the outer link L1 and the inner link L2 to move along the longitudinal direction of the stick T supported by stick supporting means in a state in which the inner link L2 is placed on the opening portion 106 to thereby allow the stick T to be inserted between the outer link L1 and the inner link L2;

raising diagonally upwardly and laterally outwardly the stick T in a state of being inserted between the outer link L1 and the inner link L2 of a loop group LG;

causing each of the suspension members 100 to further change its attitude by pivoting whereby the opening portion 106 with the inner link L2 placed thereon is moved so as to move laterally inwardly away from the stick T in the state of being inserted between the outer link L1 and the inner link L2 of the loop group LG, thereby further raising the opening portion 106; and removing the sausage S from the suspension members 100 by the diagonally upward and laterally outward raising of the stick T and the further raising of the opening portion 106 of each of the suspension members 100 so as to suspend the sausage S from the stick T.

With the apparatus of this second embodiment, in the end processing operation of the sausage S by the operator W in the suspension and end processing zone I, even if the operator W leaves the inner link L2 in a state of being disengaged from the link placing surface 106a, as described above, the inner link L2 which has been disengaged toward the downstream side can be automatically made to undergo return movement to the link placing surface 106a toward the upstream side. Accordingly, the sausage loop SL can be reliably enlarged by the opening portion 106 which is being raised, so that the stick T can be easily and reliably inserted into the sausage loop SL.

What is claimed is:

1. A sausage suspension member for suspending a sausage consisting of a multiplicity of links connected by twisted portions, comprising:

a suspending portion for suspending the sausage in a state of being divided into an outer link and an inner link, said suspending portion being formed at a position lower than a pivot axis; and an opening portion formed at a position lower than said suspending portion to allow the inner link suspended from said suspending portion to be placed thereon, wherein said suspension member is adapted to undergo primary pivoting wherein said opening portion with the inner link placed thereon is moved about the pivot axis laterally inwardly so as to enlarge an interval between the inner link and the outer link in preparation for the insertion, between the outer link and the inner link, of a stick which is being raised upwardly and laterally outwardly to suspend the sausage after said insertion, and after said primary pivoting, said suspension member is adapted to undergo secondary pivoting wherein said opening portion with the inner link placed thereon is moved about the pivot axis laterally inwardly so as to move laterally inwardly away from the stick in a state of being inserted between the inner link and the outer link.

2. The sausage suspension member according to claim 1, further comprising a driven portion provided upwardly of the pivot axis and adapted to pivot about the pivot axis so as to pivot said suspending portion and said opening portion laterally inwardly, said driven portion having a driven end portion for receiving action for pivoting said driven portion about the pivot axis laterally outwardly.

3. A method of suspending from a stick a sausage which consists of a multiplicity of links connected by twisted portions and is suspended in loop form from suspension members each including a suspending portion formed at a position lower than a pivot axis and an opening portion formed at a position lower than the suspending portion, comprising the steps of:
suspending the sausage from said suspending portion of each of said suspension members in a first attitude in a state in which the sausage is divided into an outer link and an inner link;
causing each of said suspension members in the first attitude to change its attitude to a second attitude by primary pivoting wherein said opening portion is moved about the pivot axis laterally inwardly so as to make an interval between the outer link and the inner link placed on said opening portion of said suspension member in the second attitude larger than the interval therebetween in the first attitude;
causing each of said suspension members in the second attitude to move along a longitudinal direction of the stick supported by stick supporting means in a state in which the inner link is placed on said opening portion to thereby allow the stick to be inserted between the inner link and the outer link;
raising upwardly and laterally outwardly the stick in a state of being inserted between the inner link and the outer link of a loop group consisting of a multiplicity of loops;
causing each of said suspension members in the second attitude to change its attitude to a third attitude by secondary pivoting wherein said opening portion with the inner link placed thereon is moved so as to move laterally inwardly away from the stick in the state of being inserted between the inner link and the outer link of the loop group consisting of the multiplicity of loops; and
removing the sausage suspended from said suspension members by said upward and laterally outward raising of the stick and said secondary pivoting of said suspension members so as to suspend the sausage from the stick.

4. A suspending apparatus for suspending from a stick a sausage suspended from suspension members, comprising: suspension members for suspending a sausage consisting of a multiplicity of links connected by twisted portions; a conveyor for moving said suspension members provided on said conveyor; suspension member pivoting means for causing said suspension members to pivot; and a stick discharging device for discharging a stick, each of said suspension members including a suspending portion adapted to suspend therefrom the sausage in a state of being divided into an outer link and an inner link and formed at a position lower than a pivot axis of said suspension member and an opening portion formed at a position lower than said suspending portion to allow the inner link suspended from said suspending portion to be placed thereon,
wherein said suspension member pivoting means includes:
a sliding guide member for guiding said suspension members such that said opening portion with the inner link placed thereon is moved about the pivot axis laterally inwardly so as to enlarge an interval between the inner link and the outer link in preparation for the insertion, between the outer link and the inner link, of the stick which is being raised upwardly and laterally outwardly to suspend the sausage after said insertion; and
a pivot driving member for causing a multiplicity of said suspension members to pivot about the pivot axis laterally inwardly so as to move said opening portion with the inner link placed thereon laterally inwardly away from the stick in a state of being inserted between the inner link and the outer link.

5. A method of suspending from a stick a sausage which consists of a multiplicity of links connected by twisted portions and is suspended in loop form from suspension members each including a suspending portion formed at a position lower than a pivot axis and an opening portion formed at a position lower than the suspending portion, comprising the steps of:
suspending the sausage from each of said suspension members in a state in which the sausage is divided into an outer link and an inner link;
causing the opening portion of each of said suspension members with the sausage suspended therefrom to pivot about the pivot axis laterally outwardly;
causing the laterally outwardly pivoted opening portion of each of said suspension members to pivot about the pivot axis laterally inwardly;
causing the laterally inwardly pivoted opening portion of each of said suspension members to further pivot about the pivot axis such that an interval between the outer link and the inner link placed on the opening portion being raised becomes larger than the interval between the outer link and the inner link placed on the opening portion at the time when the sausage was suspended therefrom;
causing each of said suspension members which changed its attitude to an attitude for enlarging the interval between the outer link and the inner link to move along a longitudinal direction of the stick supported by stick supporting means in a state in which the inner link is placed on the opening portion to thereby allow the stick to be inserted between the outer link and the inner link;
raising diagonally upwardly and laterally outwardly the stick in a state of being inserted between the outer link and the inner link of a loop group;
causing each of said suspension members to further change its attitude by pivoting wherein the opening portion with the inner link placed thereon is moved so as to move laterally inwardly away from the stick in the state of being inserted between the outer link and the inner link of the loop group, thereby further raising the opening portion; and
removing the sausage from said suspension members by said diagonally upward and laterally outward raising of the stick and said further raising of the opening portion of each of said suspension members so as to suspend the sausage from the stick.

6. A suspending apparatus for suspending from a stick a sausage suspended from suspension members, comprising:

suspension members for suspending the sausage consisting of a multiplicity of links connected by twisted portions, each of said suspension members including a suspending portion adapted to suspend the sausage in a state of being divided into an outer link and an inner link and formed at a position lower than a pivot axis and an opening portion formed at a position lower than said suspending portion to allow the inner link suspended from said suspending portion to be placed thereon;

means for causing the opening portion of each of said suspension members with the sausage suspended therefrom to pivot about the pivot axis laterally outwardly, for causing the laterally outwardly pivoted opening portion of each of said suspension members to pivot about the pivot axis laterally inwardly, and for causing the laterally inwardly pivoted opening portion of each of said suspension members to further pivot about the pivot axis such that an interval between the outer link and the inner link placed on the opening portion being raised becomes larger than the interval between the outer link and the inner link placed on the opening portion at the time when the sausage was suspended therefrom;

means for causing each of said suspension members which changed its attitude to an attitude for enlarging the interval between the outer link and the inner link to move along a longitudinal direction of the stick supported by stick supporting means in a state in which the inner link is placed on the opening portion to thereby allow the stick to be inserted between the outer link and the inner link;

means for raising diagonally upwardly and laterally outwardly the stick in a state of being inserted between the outer link and the inner link of a loop group; and means for causing each of said suspension members to further change its attitude by pivoting wherein the opening portion with the inner link placed thereon is moved so as to move laterally inwardly away from the stick in the state of being inserted between the outer link and the inner link of the loop group, thereby further raising the opening portion.

\* \* \* \* \*